United States Patent
Nishizawa et al.

(10) Patent No.: US 10,474,226 B2
(45) Date of Patent: Nov. 12, 2019

(54) HEAD-MOUNTED DISPLAY DEVICE, COMPUTER PROGRAM, AND CONTROL METHOD FOR HEAD-MOUNTED DISPLAY DEVICE

(71) Applicant: SEIKO EPSON CORPORATION, Tokyo (JP)

(72) Inventors: Kazuo Nishizawa, Matsumoto (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/801,711

(22) Filed: Nov. 2, 2017

(65) Prior Publication Data
US 2018/0196505 A1 Jul. 12, 2018

(30) Foreign Application Priority Data

Nov. 30, 2016 (JP) .................................. 2016-232373
May 29, 2017 (JP) .................................. 2017-105477

(51) Int. Cl.
*G06F 3/01* (2006.01)
*G06F 3/038* (2013.01)
*G02B 27/01* (2006.01)

(52) U.S. Cl.
CPC .......... *G06F 3/012* (2013.01); *G02B 27/0172* (2013.01); *G06F 3/038* (2013.01); *G02B 2027/014* (2013.01); *G02B 2027/0118* (2013.01); *G02B 2027/0138* (2013.01); *G02B 2027/0178* (2013.01)

(58) Field of Classification Search
CPC ..... G06F 3/012; G06F 3/038; G02B 27/0093; G02B 27/0172; G02B 2027/0118; G02B 2027/0138; G02B 2027/014; G02B 2027/0178

USPC ........................................................ 345/158
See application file for complete search history.

(56) References Cited

U.S. PATENT DOCUMENTS

| | | | | |
|---|---|---|---|---|
| 2010/0245389 A1* | 9/2010 | Aoki | ................... | G01R 13/0245 345/641 |
| 2015/0205494 A1* | 7/2015 | Scott | ................... | G06F 3/04845 345/158 |
| 2015/0338652 A1* | 11/2015 | Lim | ................... | G06K 9/00201 345/158 |

FOREIGN PATENT DOCUMENTS

JP H06-187092 A 7/1994

\* cited by examiner

*Primary Examiner* — Jennifer Mehmood
*Assistant Examiner* — Ngan T Pham Lu
(74) *Attorney, Agent, or Firm* — Oliff PLC

(57) ABSTRACT

An HMD includes an image display section configured to display a display image in a display region to be recognizable together with an outside scene, a display control section configured to cause the display section to display, in the display region, a pointer indicating a pointed position, and a six-axis sensor and a detection control section configured to detect operation. The display control section switches a first operation mode for moving, according to the operation detected by the six-axis sensor and the detection control section, a position of the pointer to correspond to the outside scene and a second operation mode for moving, according to the operation detected by the six-axis sensor and the detection control section, the position of the pointer in a form different from the movement corresponding to the outside scene.

23 Claims, 22 Drawing Sheets

HEAD-MOUNTED DISPLAY DEVICE, COMPUTER PROGRAM, AND CONTROL METHOD FOR HEAD-MOUNTED DISPLAY DEVICE

BACKGROUND

1. Technical Field

The present invention relates to a head-mounted display device, a computer program, and a control method for the head-mounted display device.

2. Related Art

There has been known a pointing device that moves a marker to, for example, select a displayed menu or designate a displayed object. The pointing device also detects a movement of the head of a user and moves a marker according to the detected movement of the head (see, for example, JP-A-6-187092 (Patent Literature 1).

Patent Literature 1 discloses a head-driven pointing device that detects changes in a position and a direction of a head on the basis of ultrasound, an electromagnetic wave, and the like transmitted from a plurality of transmission devices mounted on the head and points a specific position on a display according to the detected changes in the position and the direction of the head.

Incidentally, when operating a marker according to a movement of a head in a head-mounted display device, in some cases, a user has to continue to tilt the head while the user moves the marker and has to continue to maintain an unnatural posture. When the user operates an operation section such as a track pad to move the marker to a target position, if the operation section is not fixed, it is not easy for the user to move the marker as imaged by the user. The head-mounted display device lacks operability. Therefore, there is a demand for improvement of the operability of the head-mounted display device.

SUMMARY

An advantage of some aspects of the invention is to improve operability and improve convenience of use of a head-mounted display device.

An aspect of the invention is directed to a head-mounted display device mounted on a head of a user, the head-mounted display device including: a display section configured to display a display image in a display region to be recognizable together with an outside scene; a display control section configured to cause the display section to display, in the display region, a marker indicating a pointed position; and a detecting section configured to detect operation. The display control section switches a first operation mode for moving, according to the operation detected by the detecting section, a position of the marker to correspond to the outside scene and a second operation mode for moving, according to the operation detected by the detecting section, the position of the marker in a form different from the movement corresponding to the outside scene.

According to the aspect of the invention, it is possible to switch and execute the first operation mode for moving the position of the marker to correspond to the outside scene and the second operation mode for moving the position of the marker in the form different from the movement corresponding to the outside scene. For this reason, it is possible to move the marker in a plurality of forms. It is possible to improve operability of the marker and improve convenience of use of the head-mounted display device.

In the head-mounted display device according to the aspect of the invention, the detecting section may detect first operation and second operation as the operation, and the display control section may move the position of the marker according to the first operation detected by the detecting section and, after the movement of the marker corresponding to the first operation, move, according to the second operation detected by the detecting section, the position of the marker in a form different from the movement of the marker corresponding to the first operation.

According to the aspect of the invention with this configuration, it is possible to move the position of the marker according to a plurality of kinds of operation of the first operation and the second operation. It is possible to move the marker in the different forms in the first operation and the second operation. Therefore, it is possible to improve the operability of the marker and improve the convenience of use of the head-mounted display device.

In the head-mounted display device according to the aspect of the invention, the display control section may move, starting from the position of the marker moved by the first operation, according to the second operation, the position of the marker in a form different from the first operation.

According to the aspect of the invention with this configuration, it is possible to move the position of the marker according to the second operation starting from the position of the marker moved by the first operation.

In the head-mounted display device according to the aspect of the invention, the detecting section may detect a motion of the user as at least either one of the first operation and the second operation.

According to the aspect of the invention with this configuration, the motion of the user is detected as at least either one of the first operation and the second operation. Therefore, it is possible to move the position of the marker according to the motion.

In the head-mounted display device according to the aspect of the invention, the detecting section may detect, as the motion of the user, at least one of a tilt of the head with respect to a body axis of the user and rotation of the head around the body axis, and the display control section may determine a movement amount of the marker in at least either one direction of a vertical direction and a horizontal direction of the display region on the basis of at least one of the tilt and the rotation around the body axis of the head detected by the detecting section and move the position of the marker on the basis of the determined movement amount.

According to the aspect of the invention with this configuration, the movement amount of the marker in either one of the vertical direction and the horizontal direction of the display region is determined according to the tilt of the head and the rotation of the head around the body axis of the user. For this reason, it is possible to move the marker according to the tilt of the head of the user or the rotation of the head around the body axis.

In the head-mounted display device according to the aspect of the invention, the detecting section may detect, as the first operation, operation received by an operation section included in the head-mounted display device and detect a movement of the head as the second operation.

According to the aspect of the invention with this configuration, the operation of the operation section is detected as the first operation and the movement of the head is detected as the second operation. Therefore, it is possible to move the position of the marker according to the operation of the operation section and the movement of the head.

In the head-mounted display device according to the aspect of the invention, the head-mounted display device may further include an imaging section configured to image the outside scene, the display control section may specify, during execution of the first operation mode, on the basis of a picked-up image of the imaging section, a target object visually recognized over the marker and specify, during execution of the second operation mode, the display image corresponding to the position of the marker from a plurality of the display images displayed in the display region.

According to the aspect of the invention with this configuration, during the execution of the first operation mode, the target object visually recognized over the marker is specified and, during the execution of the second operation mode, the display image corresponding to the position of the marker is specified. For this reason, it is possible to change a target to be specified to the target object or the display image by changing an operation mode.

In the head-mounted display device according to the aspect of the invention, during execution of the first operation mode, when the first operation or the second operation is detected by the detecting section, the display control section may move, according to the first operation or the second operation, the marker on the basis of the outside scene visually recognized by the user, and, during execution of the second operation mode, when the first operation or the second operation is detected by the detecting section, the display control section may move, according to the first operation or the second operation, the marker on the basis of the display image visually recognized by the user.

According to the aspect of the invention with this configuration, according to the first operation or the second operation detected during the execution of the first operation mode, the marker is moved on the basis of the outside scene visually recognized by the user and, according to the first operation or the second operation detected during the execution of the second operation mode, the marker is moved on the basis of the display image visually recognized by the user. For this reason, it is easy to align the marker with the target object or the display image by switching the operation mode.

In the head-mounted display device according to the aspect of the invention, when moving the marker according to the second operation, the display control section may set a movement amount for moving the marker according to the second operation smaller than a movement amount for moving the marker according to the first operation to perform the movement of the marker corresponding to the first operation and the movement of the marker corresponding to the second operation in different forms.

According to the aspect of the invention with this configuration, a movement amount of a marker moved according to the second operation is smaller than a movement amount of the marker moved according to the first operation. For this reason, by moving the marker according to the second operation having the movement amount smaller than the movement amount of the first operation after moving the marker according to the first operation having the movement amount larger than the movement amount of the second operation, it is possible to reduce the number of times of operation for moving the marker to the position of the target object or the display image.

In the head-mounted display device according to the aspect of the invention, the head-mounted display device may further include a distance detecting section configured to detect a distance to a target object visually recognized by the user through the display section, and the display control section may move the marker in a different form according to the distance to the target object detected by the distance detecting section.

According to the aspect of the invention with this configuration, it is possible to move the marker in a different form according to the distance to the target object. For this reason, it is possible to improve operability of the operation of the marker and improve the convenience of use of the head-mounted display device.

In the head-mounted display device according to the aspect of the invention, the display control section may set the operation detected by the detecting section as the first operation when the distance to the target object detected by the distance detecting section is larger than a threshold, set the operation detected by the detecting section as the second operation when the distance to the target object detected by the distance detecting section is equal to or smaller than the threshold, and set a movement amount for moving the marker according to the first operation smaller than a movement amount for moving the marker according to the second operation.

According to the aspect of the invention with this configuration, the first operation having the movement amount larger than the movement amount of the second operation is detected when the distance to the target object is larger than the threshold and the second operation having the movement amount smaller than the movement amount of the first operation is detected when the distance to the target object is equal to or smaller than the threshold. For this reason, it is possible to change the operation used for the movement of the marker and change the movement amount of the marker according to the distance to the target object. Therefore, it is possible to improve operability of the operation of the marker and improve the convenience of use of the head-mounted display device.

Another aspect of the invention is directed to a head-mounted display device mounted on a head of a user, the head-mounted display device including: a display section configured to display a display image in a display region to be transmitted through an outside scene and recognizable together with the outside scene; an imaging section configured to image the outside scene; and a display control section configured to cause the display section to display, in the display region, a marker indicating a pointed position. The display control section switches and executes, on the basis of a picked-up image of the imaging section, a first operation mode for specifying a target object visually recognized over the marker and a second operation mode for specifying the display image corresponding to a position of the marker from a plurality of the display images displayed in the display region.

According to the aspect of the invention, the target object visually recognized over the marker is specified according to the first operation mode and the display image corresponding to the position of the marker is specified according to the second operation mode. For this reason, it is possible to switch a specifiable target by changing an operation mode to the first operation mode or the second operation mode.

In the head-mounted display device according to the aspect of the invention, the head-mounted display device may further include a detecting section configured to detect operation, and, during execution of the first operation mode, when the operation is detected by the detecting section, the display control section may move, according to the detected operation, the marker on the basis of the outside scene visually recognized by the user, and, during execution of the second operation mode, when the operation is detected by the detecting section, the display control section may move, according to the detected operation, the marker on the basis of the display image visually recognized by the user.

According to the aspect of the invention with this configuration, according to the operation detected during the execution of the first operation mode, the marker is moved on the basis of the outside scene visually recognized by the user and, according to the operation detected during the execution of the second operation mode, the marker is moved on the basis of the display image visually recognized by the user. For this reason, it is possible to change the basis in moving the marker by changing the operation mode to the first operation mode or the second operation mode. It is easy to align the marker with the target object or the display image.

In the head-mounted display device according to the aspect of the invention, the detecting section may detect, as first operation, operation received by the operation section included in the head-mounted display device and detect a movement of a head of the user as second operation, and the display control section may move a position of the marker according to the first operation detected by the detecting section and, after the movement of the marker corresponding to the first operation, move the position of the marker according to the second operation detected by the detecting section, and set a movement amount in moving the marker according to the second operation smaller than a movement amount in moving the marker according to the first operation.

According to the aspect of the invention with this configuration, the movement amount of the marker moved according to the second operation is smaller than the movement amount of the marker moved according to the first operation. Therefore, by moving the marker according to the second operation having the movement amount smaller than the movement amount of the first operation after moving the marker according to the first operation having the movement amount larger than the movement amount of the second operation, it is possible to reduce the number of times of operation for moving the marker to the position of the target object or the display image.

In the head-mounted display device according to the aspect of the invention, the display control section may cause, during execution of the first operation mode, the display section to display indication indicating a moving direction of the marker based on the outside scene and cause, during execution of the second operation mode, the display section to display indication indicating a moving direction of the marker based on the display image.

According to the aspect of the invention with this configuration, during the execution of the first operation mode, the moving direction of the marker based on the outside scene is displayed and, during the execution of the second operation mode, the moving direction of the marker based on the display image is displayed. Therefore, it is possible to cause the user to visually recognize the moving directions of the marker in the first operation mode and the second operation mode.

In the head-mounted display device according to the aspect of the invention, the display control section may manage a display position of the marker according to a coordinate in the display region and, when the operation detected by the detecting section is disabled, manage the display position of the marker in association with a coordinate of a three-dimensional space corresponding to a real space.

According to the aspect of the invention with this configuration, the display position of the marker is managed according to the coordinate in the display region. When the operation detected by the detecting section is disabled, the display position of the marker is managed in association with the coordinate of the three-dimensional space corresponding to the real space. Therefore, when the second operation is disabled, the display position of the marker is managed in association with the coordinate of the three-dimensional space corresponding to the real space. Therefore, even if a movement of the head is detected, the display position of the marker is not changed.

In the head-mounted display device according to the aspect of the invention, the head-mounted display device may further include an operation section configured to receive operation, and the display control section may detect a moving object on the basis of the picked-up image of the imaging section and cause the display section to display the marker in a position of the display region corresponding to the detected moving object.

According to the aspect of the invention with this configuration, it is possible to detect the moving object from the picked-up image of the imaging section and cause the display section to display the marker in the position of the display region corresponding to the moving object.

In the head-mounted display device according to the aspect of the invention, the head-mounted display device may further include a mark detecting section configured to detect an identification mark disposed in the target object, and the display control section may cause the display section to display the marker in a position of the target object where the identification mark detected by the mark detecting section is disposed and move the position of the marker according to the operation detected by the detecting section.

According to the aspect of the invention with this configuration, it is possible to cause the display section to display the marker in the position of the target object where the identification mark is disposed and move the position of the displayed marker according to the operation. For this reason, it is possible to easily perform alignment of the marker.

In the head-mounted display device according to the aspect of the invention, the head-mounted display device may further include a receiving section configured to receive a beacon signal transmitted from a beacon transmitter disposed in the target object, and the display control section may be connected to the beacon transmitter on the basis of the beacon signal received by the receiving section, receive additional information transmitted from the transmitter, and cause the display section to display the additional information in the display region.

According to the aspect of the invention with this configuration, it is possible to connect the display control section to the beacon transmitter on the basis of the beacon signal transmitted from the beacon transmitter, acquire the additional information from the beacon transmitter and cause the display section to display the additional information.

Still another aspect of the invention is directed to a computer program executed by a computer mounted on a head-mounted display device including: a display section configured to display a display image in a display region to be transmitted through an outside scene and recognizable together with the outside scene; a display control section configured to cause the display section to display, in the display region, a marker indicating a pointed position; and a detecting section configured to detect operation, the head-mounted display device being mounted on a head of a user, the computer program causing the computer to execute: a procedure for moving, according to the operation detected by the detecting section, a position of the marker to correspond to the outside scene; and a procedure for moving, according to the operation detected by the detecting section, the position of the marker in a form different from the movement corresponding to the outside scene.

According to the aspect of the invention, it is possible to switch the procedure for moving, according to the operation detected by the detecting section, the position of the marker to correspond to the outside scene and the procedure for moving the position of the marker in the form different from the movement corresponding to the outside scene according to the operation detected by the detecting section. Therefore, it is possible to move the position of the marker in a plurality of forms. It is possible to improve operability of the marker and improve convenience of use of the head-mounted display device.

Still another aspect of the invention is directed to a control method for a head-mounted display device including: a display section configured to display a display image in a display region to be transmitted through an outside scene and recognizable together with the outside scene; a display control section configured to cause the display section to display, in the display region, a marker indicating a pointed position; and a detecting section configured to detect operation, the head-mounted display device being mounted on a head of a user, the control method including: moving, according to the operation detected by the detecting section, a position of the marker to correspond to the outside scene; and moving, according to the operation detected by the detecting section, the position of the marker in a form different from the movement corresponding to the outside scene.

According to the aspect of the invention, it is possible to switch the moving, according to the operation detected by the detecting section, the position of the marker to correspond to the outside scene and the moving, according to the operation detected by the detecting section, the position of the marker in the form different from the movement corresponding to the outside scene. Therefore, it is possible to move the position of the marker in a plurality of forms. It is possible to improve operability of the marker and improve convenience of use of the head-mounted display device.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
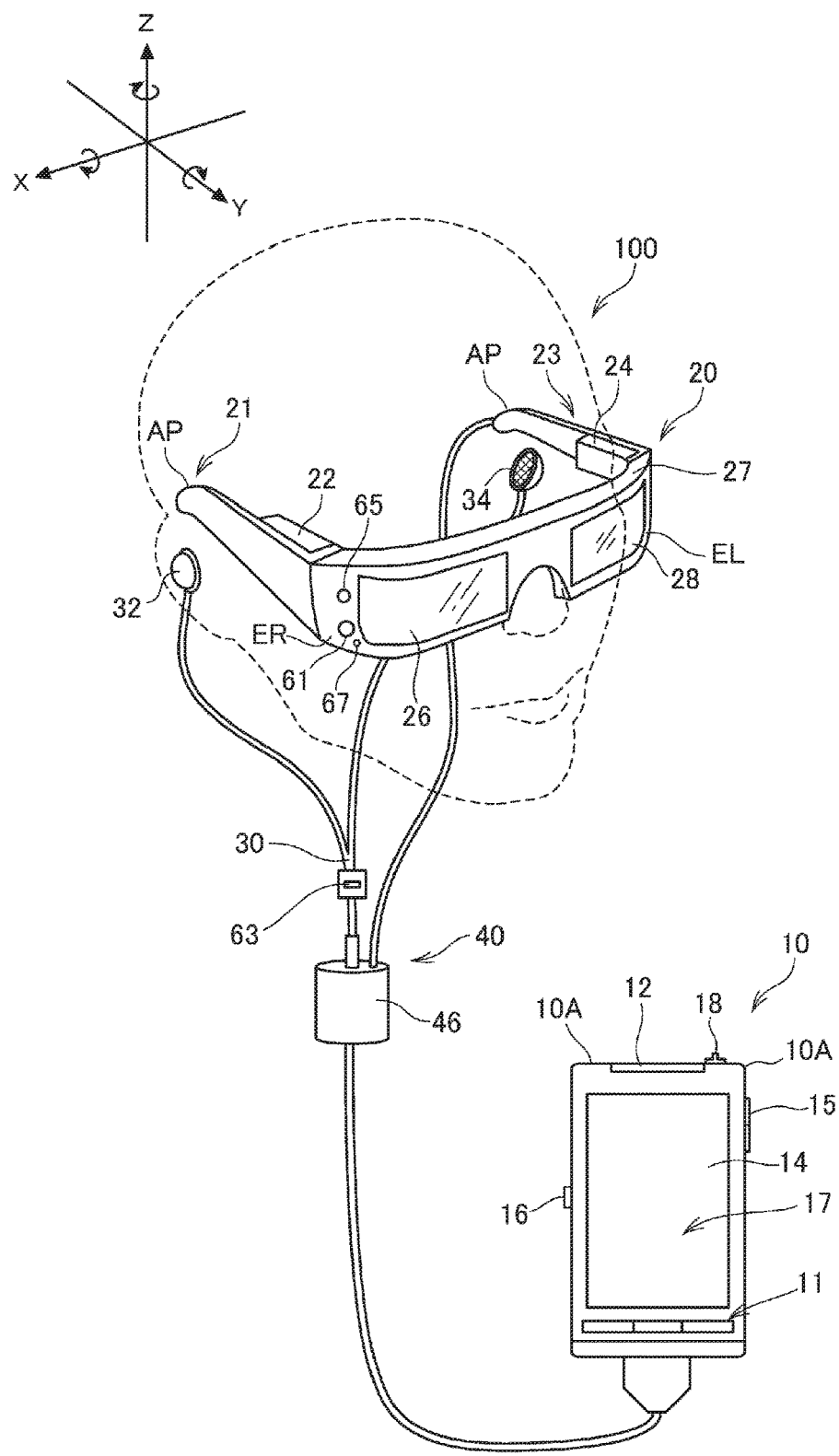
FIG. 1 is an exterior view of an HMD.

FIG. 1 is an exterior view of an exterior configuration of an HMD (Head Mounted Display: head-mounted display device) 100 applied with the invention.

The HMD 100 is a display device including an image display section 20 (a display section) that causes a user to visually recognize a virtual image in a state in which the image display section 20 is worn on the head of the user and a control device 10 that controls the image display section 20.

The control device 10 includes a flat box-shaped case 10A (also considered to be a housing or a main body) as shown in FIG. 1. The case 10A includes a button 11, an LED indicator 12, a track pad 14, an up/down key 15, a changeover switch 16, and a power switch 18. The button 11, the track pad 14, the up/down key 15, the changeover switch 16, and the power switch 18 are operation sections operated by the user. The LED indicator 12 functions as, for example, a sub-display section that displays an operation state of the HMD 100. The user can operate the HMD 100 by operating the operation sections. The control device 10 functions as a controller of the HMD 100.

The image display section 20 is a wearing body worn on the head of the user. In this embodiment, the image display section 20 has an eyeglass shape. The image display section 20 includes a right display unit 22, a left display unit 24, a right light guide plate 26, and a left light guide plate 28 in a main body including a right holding section 21, a left holding section 23, and a front frame 27.

The right holding section 21 and the left holding section 23 respectively extend backward from both end portions of the front frame 27 and, like temples of eyeglasses, hold the image display section 20 on the head of the user. Of both the end portions of the front frame 27, the end portion located on the right side of the user in a worn state of the image display section 20 is represented as an end portion ER and the end portion located on the left side of the user is represented as an end portion EL. The right holding section 21 is provided to extend from the end portion ER of the front frame 27 to a position corresponding to the right temporal region of the user in the worn state of the image display section 20. The left holding section 23 is provided to extend from the end portion EL to a position corresponding to the left temporal region of the user in the worn state of the image display section 20.

The right light guide plate 26 and the left light guide plate 28 are provided in the front frame 27. The right light guide plate 26 is located in front of the right eye of the user in the worn state of the image display section 20 and causes the right eye to visually recognize an image. The left light guide plate 28 is located in front of the left eye of the user in the worn state of the image display section 20 and causes the left eye to visually recognize the image.

The front frame 27 has a shape obtained by coupling one end of the right light guide plate 26 and one end of the left light guide plate 28 to each other. A position of the coupling corresponds to the middle of the forehead of the user in the worn state in which the user wears the image display section 20. In the front frame 27, nose pad sections in contact with the nose of the user in the worn state of the image display section 20 may be provided in the coupling position of the right light guide plate 26 and the left light guide plate 28. In this case, the image display section 20 can be held on the head of the user by the nose pad sections and the right holding section 21 and the left holding section 23. A belt (not shown in the figure) in contact with the back of the head of the user in the worn state of the image display section 20 may be coupled to the right holding section 21 and the left holding section 23. In this case, the image display section 20 can be held on the head of the user by the belt.

The right display unit 22 realizes display of an image by the right light guide plate 26. The right display unit 22 is provided in the right holding section 21 and located in the vicinity of the right temporal region of the user in the worn state. The left display unit 24 realizes display of an image by the left light guide plate 28. The left display unit 24 is provided in the left holding section 23 and located in the vicinity of the left temporal region of the user in the worn state.

The right light guide plate 26 and the left light guide plate 28 in this embodiment are optical sections formed of light transmissive resin or the like and are, for example, prisms. The right light guide plate 26 and the left light guide plate 28 guide image lights emitted by the right display unit 22 and the left display unit 24 to the eyes of the user.

Dimming plates (not shown in the figure) may be provided on the surfaces of the right light guide plate 26 and the left light guide plate 28. The dimming plates are thin plate-like optical elements having different transmittance depending on a wavelength region of light. The dimming plates function as so-called wavelength filters. The dimming plates are disposed to cover the front side of the front frame 27, which is the opposite side of the side of the eyes of the user. By selecting an optical characteristic of the dimming plates as appropriate, it is possible to adjust the transmittances of lights in any wavelength regions such as visible light, infrared light, and ultraviolet light and it is possible to adjust a light amount of external light made incident on the right light guide plate 26 and the left light guide plate 28 from the outside and transmitted through the right light guide plate 26 and the left light guide plate 28.

Figure 2:
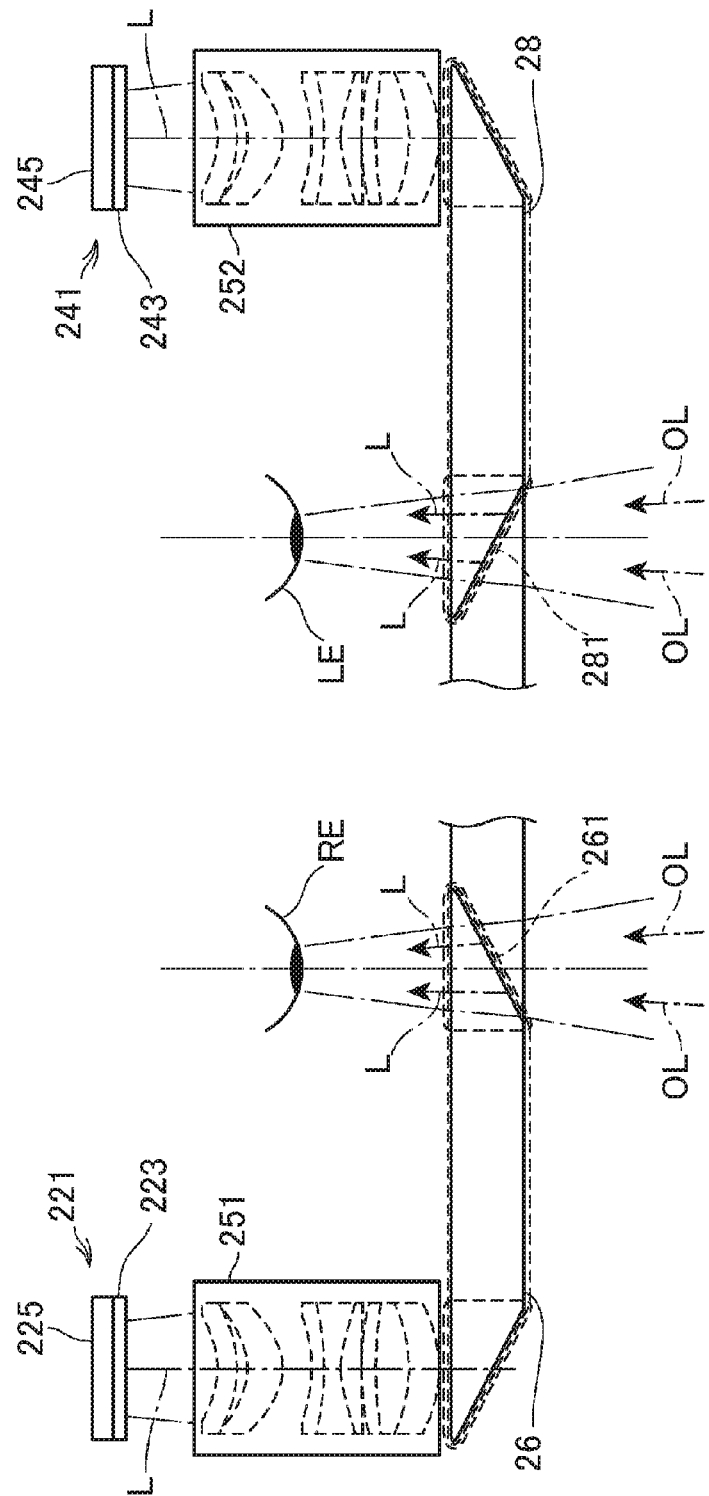
FIG. 2 is a main part plan view showing the configuration of an optical system of the HMD.

The image display section 20 includes an optical system that guides image lights respectively generated by the right display unit 22 and the left display unit 24 to the right light guide plate 26 and the left light guide plate 28 (see FIG. 2). The image lights guided to the right light guide plate 26 and the left light guide plate 28 are made incident on the right eye and the left eye of the user and causes the user to visually recognize a virtual image. Consequently, the image display section 20 displays an image.

When external light is transmitted through the right light guide plate 26 and the left light guide plate 28 and made incident on the eyes of the user from the front of the user, the image lights forming the virtual image and the external light are made incident on the eyes of the user. Visibility of the virtual image is affected by the strength of the external light. For this reason, for example, by attaching the dimming plates to the front frame 27 and selecting or adjusting the optical characteristic of the diming plate as appropriate, it is possible to adjust easiness of visual recognition of the virtual image. In a typical example, it is possible to use diming plates having light transmittance enough for enabling the user wearing the HMD 100 to visually recognize at least a scene on the outside. When the dimming plates are used, it is possible to expect an effect of protecting the right light guide plate 26 and the left light guide plate 28 and preventing damage, adhesion of soil, and the like to the right light guide plate 26 and the left light guide plate 28. The dimming plates may be detachably attachable to the front frame 27 or respectively to the right light guide plate 26 and the left light guide plate 28. A plurality of kinds of dimming plates may be able to be alternately attached. The dimming plates may be omitted.

A camera 61 is disposed in the front frame 27 of the image display section 20. The configuration and the disposition of the camera 61 are determined to image the direction of an outside scene visually recognized by the user in a state in which the user wears the image display section 20. For example, the camera 61 is provided in a position where the camera 61 does not block external light transmitted through the right light guide plate 26 and the left light guide plate 28 on the front surface of the front frame 27. In the example shown in FIG. 1, the camera 61 is disposed on the end portion ER side of the front frame 27. However, the camera 61 may be disposed on the end portion EL side or may be disposed in a coupling section of the right light guide plate 26 and the left light guide plate 28. The camera 61 is equivalent to the "imaging section" in the aspect of the invention.

The camera 61 is a digital camera including an imaging device such as a CCD or a CMOS and an imaging lens. The camera 61 in this embodiment is a monocular camera but may be configured by a stereo camera. The camera 61 images at least a part of an outside scene (a real space) in a front side direction of the HMD 100, in other words, a field of vision direction of the user in a state in which the HMD 100 is mounted. In another expression, the camera 61 images a range or a direction overlapping the field of vision of the user and images a direction gazed by the user. The direction and the breadth of an angle of view of the camera 61 can be set as appropriate. In this embodiment, as explained below, the angle of view of the camera 61 includes the outside world visually recognized by the user through the right light guide plate 26 and the left light guide plate 28. More desirably, the angle of view of the camera 61 is set such that the camera 61 can image the entire field of vision of the user visually recognizable through the right light guide plate 26 and the left light guide plate 28.

Figure 5:
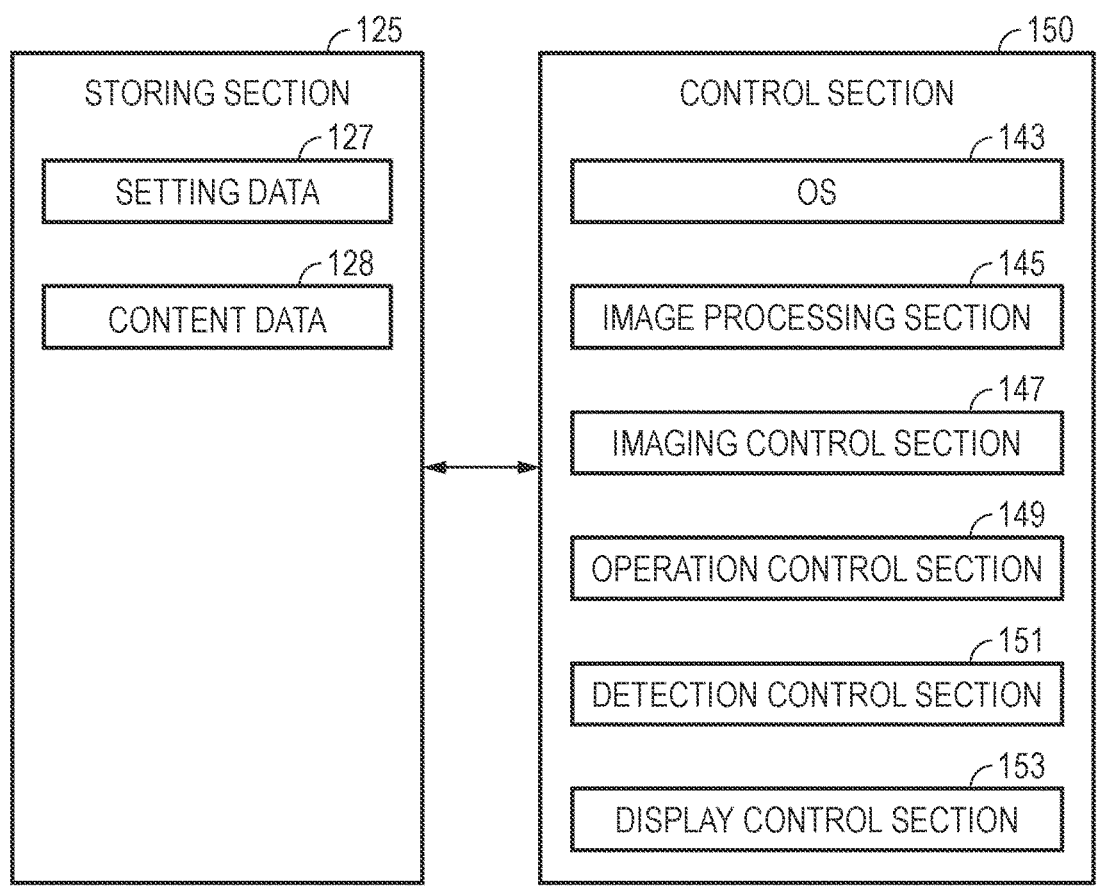
FIG. 5 is a functional block diagram of a control device.

The camera 61 executes imaging according to control by an imaging control section 147 included in a control section 150 (FIG. 5). The camera 61 outputs picked-up image data to the control section 150 via an interface 211 explained below.

The HMD 100 may include a distance sensor (not shown in the figure) that detects a distance to a measurement target object located in a preset measurement direction. The distance sensor can be disposed in, for example, a coupling portion of the right light guide plate 26 and the left light guide plate 28 in the front frame 27. In this case, in the worn state of the image display section 20, the position of the distance sensor is substantially the middle of both the eyes of the user in the horizontal direction and above both the eyes of the user in the vertical direction. The measurement direction of the distance sensor can be set to, for example, the front side direction of the front frame 27. In other words, the measurement direction is a direction overlapping the imaging direction of the camera 61. The distance sensor can be configured to include, for example, a light source such as an LED or a laser diode and a light receiving section that receives reflected light of light emitted by the light source and reflected on the measurement target object. The distance sensor only has to execute triangulation processing and distance measurement processing based on a time difference according to control by the control section 150. The distance sensor may be configured to include a sound source that emits ultrasound and a detecting section that receives the ultrasound reflected on the measurement target object. In this case, the distance sensor only has to execute the distance measurement processing on the basis of a time difference until the reflection of the ultrasound according to the control by the control section 150.

FIG. 2 is a main part plan view showing the configuration of an optical system included in the image display section 20. In FIG. 2, a left eye LE and a right eye RE of the user are shown for explanation.

As shown in FIG. 2, the right display unit 22 and the left display unit 24 are symmetrically configured. As a component for causing the right eye RE of the user to visually recognize an image, the right display unit 22 includes an OLED (Organic Light Emitting Diode) unit 221 that emits image light and a right optical system 251 including a lens group for guiding image light L emitted by the OLED unit 221. The image light L is guided to the right light guide plate 26 by the right optical system 251.

The OLED unit 221 includes an OLED panel 223 and an OLED driving circuit 225 that drives the OLED panel 223. The OLED panel 223 is a self-emitting display panel configured by arranging, in a matrix shape, light emitting elements that emit lights with organic electroluminescence and respectively emit color lights of R (red), G (green), and B (blue). The OLED panel 223 includes a plurality of pixels, one pixel of which is a unit including one each of R, G, and B elements. The OLED panel 223 forms an image with the pixels arranged in the matrix shape. The OLED driving circuit 225 executes selection of a light emitting element included in the OLED panel 223 and energization to the light emitting element and causes the light emitting element of the OLED panel 223 to emit light according to the control by the control section 150 (FIG. 5). The OLED driving circuit 225 is fixed to a rear surface, that is, a rear side of a light emitting surface of the OLED panel 223 by bonding or the like. The OLED driving circuit 225 may be configured by, for example, a semiconductor device that drives the OLED panel 223 and mounted on a substrate (not shown in the figure) fixed to the rear surface of the OLED panel 223. A temperature sensor 217 is mounted on the substrate.

Note that the OLED panel 223 may be configured by arranging, in a matrix shape, light emitting elements that emit white light and disposing color filters corresponding to the colors of R, G, and B to be superimposed one on top of another. An OLED panel 223 of a WRGB configuration including a light emitting element that emits W (white) light in addition to the light emitting elements that respectively radiate the color lights of R, G, and B may be used.

The right optical system 251 includes a collimate lens that changes the image light L emitted from the OLED panel 223 to a light beam in a parallel state. The image light L changed to the light beam in the parallel state by the collimate lens is made incident on the right light guide plate 26. A plurality of reflection surfaces that reflect the image light L are formed in an optical path for guiding light on the inside of the right light guide plate 26. The image light L is guided to the right eye RE side through a plurality of times of reflection on the inside of the right light guide plate 26. A half mirror 261 (a reflection surface) located in front of the right eye RE is formed in the right light guide plate 26. The image light L is reflected on the half mirror 261 and emitted from the right light guide plate 26 toward the right eye RE. The image light L forms an image on the retina of the right eye RE and causes the user to visually recognize the image.

The left display unit 24 includes, as components for causing the left eye LE of the user to visually recognize an image, an OLED unit 241 that emits image light and a left optical system 252 including a lens group for guiding the image light L emitted by the OLED unit 241. The image light L is guided to the left light guide plate 28 by the left optical system 252.

The OLED unit 241 includes an OLED panel 243 and an OLED driving circuit 245 that drives the OLED panel 243. The OLED panel 243 is a self-emitting display panel configured the same as the OLED panel 223. The OLED driving circuit 245 executes selection of a light emitting element included in the OLED panel 243 and energization to the light emitting element and causes the light emitting element of the OLED panel 243 to emit light according to the control by the control section 150 (FIG. 5). The OLED driving circuit 245 is fixed to a rear surface, that is, a rear side of a light emitting surface of the OLED panel 243 by bonding or the like. The OLED driving circuit 245 may be configured by, for example, a semiconductor device that drives the OLED panel 243 and mounted on a substrate (not shown in the figure) fixed to the rear surface of the OLED panel 243. A temperature sensor 239 is mounted on the substrate.

The left optical system 252 includes a collimate lens that changes the image light L emitted from the OLED panel 243 to a light beam in a parallel state. The image light L changed to the light beam in the parallel state by the collimate lens is made incident on the left light guide plate 28. The left light guide plate 28 is an optical element in which a plurality of reflection surfaces that reflect the image light L are formed and is, for example, a prism. The image light L is guided to the left eye LE side through a plurality of times of reflection on the inside of the left light guide plate 28. A half mirror 281 (a reflection surface) located in front of the left eye LE is formed in the left light guide plate 28. The image light L is reflected on the half mirror 281 and emitted from the left light guide plate 28 toward the left eye LE. The image light L forms an image on the retina of the left eye LE and causes the user to visually recognize the image.

With this configuration, the HMD 100 functions as a see-through type display device. That is, the image light L reflected on the half mirror 261 and external light OL transmitted through the right light guide plate 26 are made incident on the right eye RE of the user. The image light L reflected on the half mirror 281 and the external light OL transmitted through the half mirror 281 are made incident on the left eye LE. In this way, the HMD 100 makes the image light L of the image processed on the inside and the external light OL incident on the eyes of the user to be superimposed one on top of the other. For the user, the outside scene is seen through the right light guide plate 26 and the left light guide plate 28. An image formed by the image light L is visually recognized over the outside scene.

The half mirrors 261 and 281 are image extracting sections that reflect image lights respectively output by the right display unit 22 and the left display unit 24 and extract images. The half mirrors 261 and 281 can be considered display sections.

Note that the left optical system 252 and the left light guide plate 28 are collectively referred to as "left light guide section" as well. The right optical system 251 and the right light guide plate 26 are collectively referred to as "right light guide section" as well. The configuration of the right light guide section and the left light guide section is not limited to the example explained above. Any system can be used as long as a virtual image is formed in front of the eyes of the user using the image lights. For example, a diffraction grating may be used or a semitransmitting reflection film may be used.

Referring back to FIG. 1, the control device 10 and the image display section 20 are connected by a connection cable 40. The connection cable 40 is detachably connected to a connector (not shown in the figure) provided in a lower part of the case 10A and is connected to various circuits provided on the inside of the image display section 20 from the distal end of the left holding section 23. The connection cable 40 may include a metal cable or an optical fiber for transmitting digital data and may include a metal cable for transmitting an analog signal. A connector 46 is provided halfway in the connection cable 40. The connector 46 is a jack for connecting a stereo mini-plug. The connector 46 and the control device 10 are connected by, for example, a line for transmitting an analog sound signal. In the configuration example shown in FIG. 1, a headset 30 including a right earphone 32 and a left earphone 34 configuring a stereo headphone and a microphone 63 is connected to the connector 46.

The control device 10 and the image display section 20 may be connected by radio. For example, a configuration may be adopted in which the control device 10 and the image display section 20 transmit and receive control signals and data to and from each other through wireless communication conforming to a standard such as a Bluetooth (registered trademark) or a wireless LAN (including Wi-Fi (registered trademark)).

Figure 4:
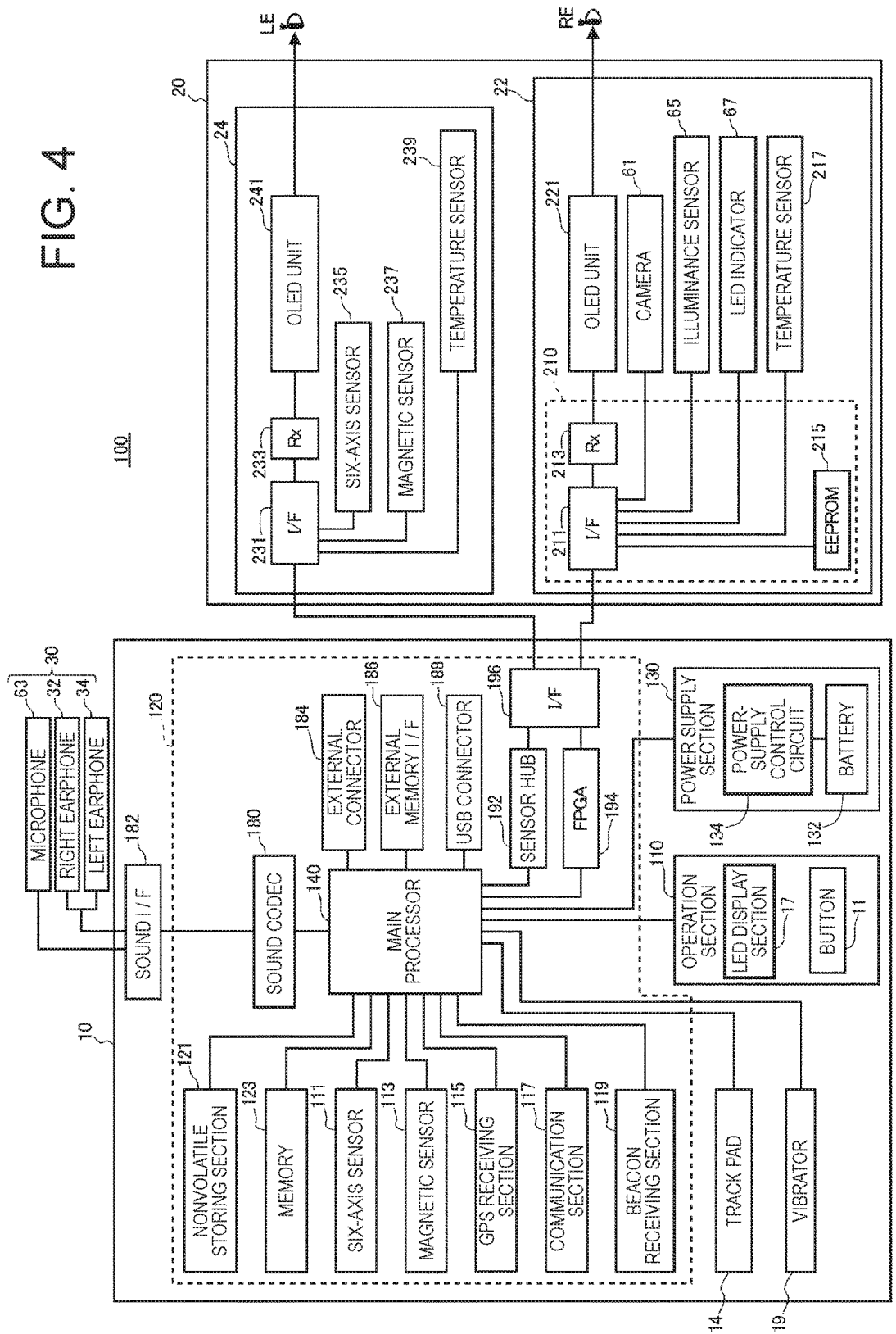
FIG. 4 is a block diagram of the HMD.

For example, as shown in FIG. 1, the microphone 63 is disposed such that a sound collecting section of the microphone 63 faces a line of sight direction of the user. The microphone 63 collects sound and outputs a sound signal to a sound interface 182 (FIG. 4). For example, the microphone 63 may be a monaural microphone or a stereo microphone, may be a microphone having directivity, or may be a nondirectional microphone.

The control device 10 includes, as operation sections operated by the user, the button 11, the LED indicator 12, the track pad 14, the up/down key 15, the changeover switch 16, and the power switch 18. These operation sections are disposed on the surface of the case 10A.

The button 11 includes keys and switches for operating the control device 10. The keys and the switches are displaced by pressing operation. For example, the button 11 includes a menu key, a home key, and a "return" key for performing operation concerning an operating system 143 (see FIG. 5) executed by the control device 10.

The LED indicator 12 is lit or flashed according to an operation state of the HMD 100. The up/down key 15 is used to input an instruction for an increase or a reduction of sound volume output from the right earphone 32 and the left earphone 34 and input an instruction for an increase and a reduction of brightness of display of the image display section 20. The changeover switch 16 is a switch for changing over an input corresponding to operation of the up-down key 15. The power switch 18 is a switch for changing over ON/OFF of a power supply of the HMD 100 and is, for example, a slide switch.

The track pad 14 includes an operation surface for detecting contact operation and outputs an operation signal according to operation on the operation surface. A detection system on the operation surface is not limited. An electrostatic system, a pressure detection system, an optical system, or other systems can be adopted. Contact (touch operation) on the track pad 14 is detected by a touch sensor (not shown in the figure). An LED display section 17 is provided in the track pad 14. The LED display section 17 includes a plurality of LEDs. Lights of the respective LEDs are transmitted through the track pad 14 and display icons and the like for operation. The icons and the like function as software buttons. The track pad 14 is equivalent to the "detecting section" in the aspect of the invention.

Figure 3:
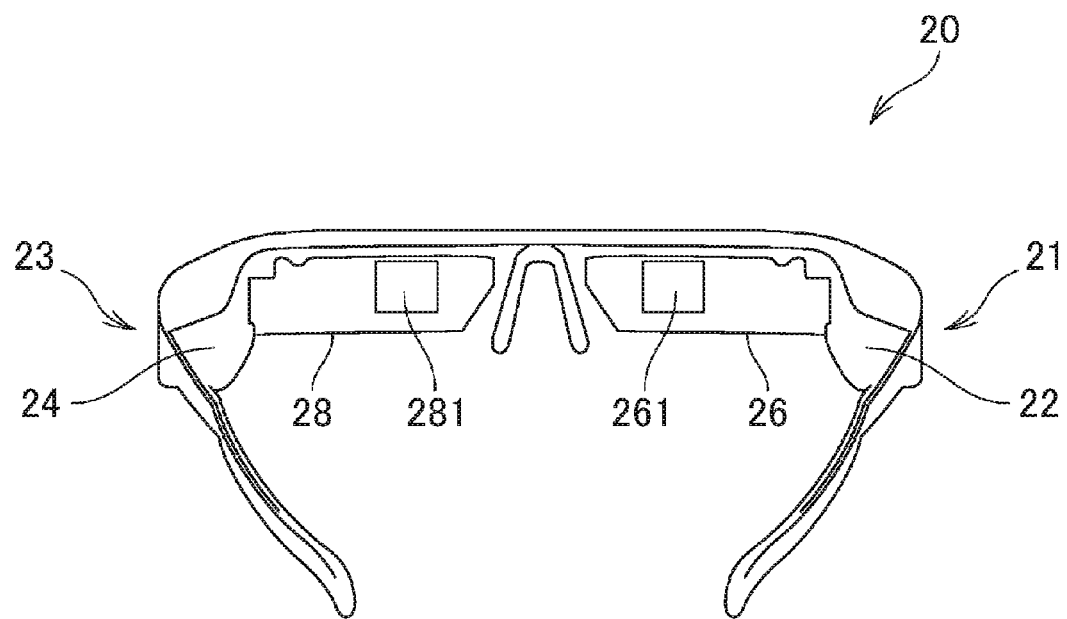
FIG. 3 is a perspective view showing the configuration of an image display section.

FIG. 3 is a perspective view showing the configuration of the image display section 20. In FIG. 3, a main part configuration of the image display section 20 viewed from the head side of the user is shown. In FIG. 3, a side in contact with the head of the user of the image display section 20, in other words, a side visible to the right eye RE and the left eye LE of the user is shown. In other words, the rear side of the right light guide plate 26 and the left light guide plate 28 is visible.

In FIG. 3, the half mirror 261 for irradiating image light on the right eye RE of the user and the half mirror 281 for irradiating image light on the left eye LE of the user are seen as substantially square regions. The entire right light guide plate 26 and left light guide plate 28 including the half mirrors 261 and 281 transmit external light as explained above. For this reason, for the user, an outside scene is visually recognized through the entire right light guide plate 26 and left light guide plate 28 and rectangular display images are visually recognized in the positions of the half mirrors 261 and 281.

The camera 61 is disposed at the end portion on the right side in the image display section 20 and images a direction that both the eyes of the user face, that is, the front for the user. An optical axis of the camera 61 is set in a direction including a line of sight direction of the right eye RE and the left eye LE. An outside scene that can be visually recognized in a state in which the user wears the HMD 100 is not always infinity. For example, when the user gazes an object located in front of the user with both the eyes, the distance from the user to the object is often approximately 30 cm to 10 m and more often approximately 1 m to 4 m. Therefore, concerning the HMD 100, standards of an upper limit and a lower limit of the distance from the user to the object during normal use may be set. The standards may be calculated by researches and experiments or the user may set the standards. An optical axis and an angle of view of the camera 61 are desirably set such that the object is included in the angle of view when the distance to the object during the normal use is equivalent to the set standard of the upper limit and when the distance is equivalent to the set standard of the lower limit.

In general, an angular field of view of a human is approximately 200 degrees in the horizontal direction and approximately 125 degrees in the vertical direction. In the angular field of view, an effective field of view excellent in an information reception ability is approximately 30 degrees in the horizontal direction and approximately 20 degrees in the vertical direction. Further, a stable field of fixation in which a gazing point gazed by the human is quickly and stably seen is approximately 60 to 90 degrees in the horizontal direction and approximately 45 to 70 degrees in the vertical direction. When the gazing point is an object located in front of the user, in the field of view of the user, a field of view of approximately 30 degree in the horizontal direction and approximately 20 degrees in the vertical direction centering on respective lines of sight of the right eye RE and the left eye LE is the effective field of view. A field of view of approximately 60 to 90 degrees in the horizontal direction and approximately 45 to 70 degrees in the vertical direction is the stable field of fixation. An angle of approximately 200 degrees in the horizontal direction and approximately 125 degrees in the vertical direction is the angular field of view. Further, an actual field of view visually recognized by the user through the right light guide plate 26 and the left light guide plate 28 can be referred to as real field of view (FOV). In the configuration in this embodiment shown in FIGS. 1 and 2, the real field of view is equivalent to an actual field of view visually recognized by the user through the right light guide plate 26 and the left light guide plate 28. The real field of view is narrower than the angular field of view and the stable field of fixation but is wider than the effective field of view.

The angle of view of the camera 61 desirably enables imaging of a range wider than the field of view of the user. Specifically, the angle of view is desirably wider than at least the effective field of view of the user. The angle of view is more desirably wider than the real field of view of the user. The angle of view is still more desirably wider than the stable field of fixation. The angle of view is most desirably wider than the angular field of view of both the eyes of the user.

The camera 61 may include a so-called wide-angle lens as an imaging lens and may be capable of imaging a wide angle of view. The wide-angle lens may include lenses called super-wide angle lens and semi-wide angle lens. The wide-angle lens may be a single focus lens or may be a zoom lens. The camera 61 may include a lens group including a plurality of lenses.

FIG. 4 is a block diagram showing the configurations of the sections configuring the HMD 100.

The control device 10 includes a main processor 140 that executes a computer program and controls the HMD 100. A nonvolatile storing section 121 and a memory 123 are connected to the main processor 140. The track pad 14 and the operation section 110 are connected to the main processor 140 as input devices. A six-axis sensor 111 and a magnetic sensor 113 are connected to the main processor 140 as sensors. A GPS receiving section 115, a communication section 117, a beacon receiving section 119, a sound codec 180, an external connector 184, an external memory interface 186, a USB connector 188, a sensor hub 192, and an FPGA 194 are connected to the main processor 140. These sections function as interfaces with the outside. The beacon receiving section 119 is equivalent to the "receiving section" in the aspect of the invention.

The main processor 140 is mounted on a controller board 120 incorporated in the control device 10. The memory 123, the beacon receiving section 119, the nonvolatile storing section 121, and the like may be mounted on the controller board 120 in addition to the main processor 140. In this embodiment, the six-axis sensor 111, the magnetic sensor 113, the GPS receiving section 115, the communication section 117, the memory 123, the nonvolatile storing section 121, the sound coded 180, and the like are mounted on the controller board 120. The external connector 184, the external memory interface 186, the USB connector 188, the sensor hub 192, the FPGA 194, and an interface 196 may be mounted on the controller board 120.

The memory 123 configures a work area where, when the main processor 140 executes a computer program, the main processor 140 temporarily stores the computer program to be executed and data to be processed. The nonvolatile storing section 121 is configured by a flash memory or an eMMC (embedded Multi Media Card). The nonvolatile storing section 121 stores the program to be executed by the main processor 140 and various data to be processed by the main processor 140 executing the computer program.

The main processor 140 detects contact operation on the operation surface of the track pad 14 and acquires an operation position on the basis of an operation signal input from the track pad 14.

The operation section 110 includes the button 11 and the LED display section 17. When an operator such as a button or a switch included in the button 11 is operated, the operation section 110 outputs an operation signal corresponding to the operated operator to the main processor 140.

The LED display section 17 controls lighting and extinction of the LED indicator 12 according to control by the main processor 140. The LED display section 17 may include an LED (not shown in the figure) disposed right under the track pad 14 and a driving circuit that lights the LED. In this case, the LED display section 17 lights, flashes, and extinguishes the LED according to the control by the main processor 140.

The six-axis sensor 111 is a motion sensor (an inertial sensor) including a three-axis acceleration sensor and a three-axis gyro (angular velocity) sensor. The six-axis sensor 111 detects a motion of the user as operation. As the six-axis sensor 111, an IMU (Inertial Measurement Unit) obtained by modulating the sensors may be adopted.

The magnetic sensor 113 is, for example, a three-axis terrestrial magnetism sensor.

The six-axis sensor 111 and the magnetic sensor 113 output detection values to the main processor 140 according to a sampling cycle designated in advance. The six-axis sensor 111 and the magnetic sensor 113 output, in response to a request of the main processor 140, the detection values to the main processor 140 at timing designated by the main processor 140.

The GPS receiving section 115 includes a not-shown GPS antenna and receives a GPS signal transmitted from a GPS satellite. The GPS receiving section 115 outputs the received GPS signal to the main processor 140. The GPS receiving section 115 measures signal strength of the received GPS signal and outputs the signal strength to the main processor 140. As the signal strength, information such as received signal strength indication (RSSI), electric field strength, magnetic field strength, and a signal to noise ratio (SNR) can be used.

The communication section 117 executes wireless communication between the communication section 117 and an external device. The communication section 117 includes an antenna, an RF circuit, a baseband circuit, and a communication control circuit. Alternatively, the communication section 117 is configured by a device obtained by integrating the antenna, the RF circuit, the baseband circuit, and the communication control circuit. The communication section 117 performs wireless communication conforming to a standard such as Bluetooth or a wireless LAN (including Wi-Fi).

The beacon receiving section 119 receives a beacon signal transmitted from a transmitting device (not shown in the figure) of the beacon signal. The beacon receiving section 119 detects a beacon ID included in the received beacon signal. The beacon ID is identification information of the transmitting device. The beacon receiving section 119 detects received signal strength indication (RSSI) of the received beacon signal and estimates a distance between the beacon receiving section 119 and the transmitting device according to the detected received signal strength indication. As the beacon signal, a signal conforming to a standard of short-range wireless communication such as NFC (Near Field Communication), Bluetooth, Bluetooth Low Energy, Bluetooth Smart, or iBeacon (registered trademark) is used. The beacon receiving section 119 is equivalent to the "distance detecting section" in the aspect of the invention.

The sound interface 182 is an interface for inputting and outputting sound signals. In this embodiment, the sound interface 182 includes the connector 46 (FIG. 1) provided in the connection cable 40. The connector 46 is connected to the headset 30. A sound signal output by the sound interface 182 is input to the right earphone 32 and the left earphone 34. Consequently, the right earphone 32 and the left earphone 34 output sound. The microphone 63 included in the headset 30 collects sound and outputs a sound signal to the sound interface 182. The sound signal input from the microphone 63 to the sound interface 182 is input to the external connector 184.

The sound codec 180 is connected to the sound interface 182 and performs encoding and decoding of sound signals input and output via the sound interface 182. The sound codec 180 may include an A/D converter that performs conversion from an analog sound signal into digital sound data and a D/A converter that performs opposite conversion of the conversion. For example, the HMD 100 in this embodiment outputs sound with the right earphone 32 and the left earphone 34 and collects sound with the microphone 63. The sound codec 180 converts digital sound data output by the main processor 140 into an analog sound signal and outputs the analog sound signal via the sound interface 182. The sound codec 180 converts an analog sound signal input to the sound interface 182 into digital sound data and outputs the digital sound data to the main processor 140.

The external connector 184 is a connector that connects an external device that communicates with the main processor 140. For example, when the external device is connected to the main processor 140 and debugging of a computer program executed by the main processor 140 and collection of a log of the operation of the HMD 100 are performed, the external connector 184 is an interface that connects the external device.

The external memory interface 186 is an interface capable of connecting a portable memory device. The external memory interface 186 includes, for example, a memory card slot into which a card-type recording medium is inserted to enable reading of data and an interface circuit. A size, a shape, and a standard of the card-type recording medium in this case are not limited and can be changed as appropriate.

The USB (Universal Serial Bus) connector 188 includes a connector and an interface circuit conforming to the USB standard. A USB memory device, a smartphone, a computer, and the like can be connected to the USB connector 188. A size and a shape of the USB connector 188 and a version of a USB standard matching the USB connector 188 can be selected and changed as appropriate.

The sensor hub 192 and the FPGA 194 are connected to the image display section 20 via the interface (I/F) 196. The sensor hub 192 acquires detection values of the various sensors included in the image display section 20 and outputs the detection values to the main processor 140. The FPGA 194 executes processing of data transmitted and received between the main processor 140 and the sections of the image display section 20 and transmission performed via the interface 196.

The HMD 100 includes a vibrator 19. The vibrator 19 includes a motor and an eccentric rotor (both of which are not shown in the figure) and may include other necessary components. The vibrator 19 rotates the motor according to the control by the main processor 140 to thereby generate vibration. For example, when operation on the operation section 110 is detected, when the power supply of the HMD 100 is turned on and off, or in other cases, the HMD 100 generates vibration with the vibrator 19 in a predetermined vibration pattern.

The right display unit 22 and the left display unit 24 of the image display section 20 are respectively connected to the control device 10. As shown in FIG. 1, in the HMD 100, the connection cable 40 is connected to the left holding section 23. A wire joined to the connection cable 40 is laid on the inside of the image display section 20. The right display unit 22 and the left display unit 24 are respectively connected to the control device 10.

The right display unit 22 includes a display unit board 210. An interface (I/F) 211 connected to the interface 196, a receiving section (Rx) 213 that receives data input from the control device 10 via the interface 211, and an EEPROM 215 are mounted on the display unit board 210.

The interface 211 connects the receiving section 213, the EEPROM 215, the temperature sensor 217, the camera 61, an illuminance sensor 65, and an LED indicator 67 to the control device 10.

The EEPROM (Electrically Erasable Programmable Read-Only Memory) 215 stores various data to enable the main processor 140 to read the data. The EEPROM 215 stores, for example, data concerning a light emission characteristic and a display characteristic of the OLED units 221 and 241 included in the image display section 20 and data concerning characteristics of the sensors included in the right display unit 22 or the left display unit 24. Specifically, the EEPROM 215 stores parameters related to gamma correction of the OLED units 221 and 241, data for compensating for detection values of the temperature sensors 217 and 239, and the like. These data are generated by a test during factory shipment of the HMD 100 and written in the EEPROM 215. After the shipment, the main processor 140 can perform processing using the data of the EEPROM 215.

The camera 61 executes imaging according to a signal input via the interface 211 and outputs picked-up image data or a signal indicating an imaging result to the control device 10.

As shown in FIG. 1, the illuminance sensor 65 is provided at the end portion ER of the front frame 27 and disposed to receive external light from the front of the user wearing the image display section 20. The illuminance sensor 65 outputs a detection value corresponding to a received light amount (light reception intensity).

As shown in FIG. 1, the LED indicator 67 is disposed near the camera 61 at the end portion ER of the front frame 27. The LED indicator 67 is lit during execution of imaging by the camera 61 to inform that the imaging is being performed.

The temperature sensor 217 detects temperature and outputs a voltage value or a resistance value corresponding to the detected temperature as a detection value. The temperature sensor 217 is mounted on the rear surface side of the OLED panel 223 (FIG. 2). The temperature sensor 217 may be mounted on, for example, the same substrate as the OLED driving circuit 225. With this configuration, the temperature sensor 217 mainly detects the temperature of the OLED panel 223.

The receiving section 213 receives data transmitted by the main processor 140 via the interface 211. When receiving image data of an image (referred to as image data) displayed by the OLED unit 221, the receiving section 213 outputs the received image data to the OLED driving circuit 225 (FIG. 2).

The left display unit 24 includes a display unit board 210. An interface (I/F) 231 connected to the interface 196 and a receiving section (Rx) 233 that receives data input from the control device 10 via the interface 231 are mounted on the display unit board 210. A six-axis sensor 235 and a magnetic sensor 237 are mounted on the display unit board 210.

The interface 231 connects the receiving section 233, the six-axis sensor 235, the magnetic sensor 237, and the temperature sensor 239 to the control device 10.

The six-axis sensor 235 is a motion sensor (an inertial sensor) including a three-axis acceleration sensor and a three-axis gyro (angular velocity) sensor. As the six-axis sensor 235, an IMU obtained by modulating the sensors may be adopted. The six-axis sensor 235 is equivalent to the "detecting section" in the aspect of the invention.

The magnetic sensor 237 is, for example, a three-axis terrestrial magnetism sensor.

The temperature sensor 239 detects temperature and outputs a voltage value or a resistance value corresponding to the detected temperature as a detection value. The temperature sensor 239 is mounted on the rear surface side of the OLED panel 243 (FIG. 2). The temperature sensor 239 may be mounted on, for example, the same substrate as the OLED driving circuit 245. With this configuration, the temperature sensor 239 mainly detects the temperature of the OLED panel 243.

The temperature sensor 239 may be incorporated in the OLED panel 243 or the OLED driving circuit 245. The substrate may be a semiconductor substrate. Specifically, when the OLED panel 243 functioning as an Si-OLED is mounted as an integrated circuit on an integrated semiconductor chip together with the OLED driving circuit 245 and the like, the temperature sensor 239 may be mounted on the semiconductor chip.

The camera 61, the illuminance sensor 65, and the temperature sensor 217 included in the right display unit 22 and the six-axis sensor 235, the magnetic sensor 237, and the temperature sensor 239 included in the left display unit 24 are connected to the sensor hub 192. The sensor hub 192 performs setting and initialization of sampling cycles of the sensors according to the control by the main processor 140. The sensor hub 192 executes energization to the sensors, transmission of control data, acquisition of detection values, and the like according to the sampling cycles of the sensors. The sensor hub 192 outputs detection values of the sensors included in the right display unit 22 and the left display unit 24 to the main processor 140 at preset timing. The sensor hub 192 may include a function of temporarily retaining the detection values of the sensors according to the timing of the output to the main processor 140. The sensor hub 192 may include a function of coping with differences in signal formats or data formats of output values of the sensors, converting the output values into data of a standardized data format, and outputting the data to the main processor 140.

The sensor hub 192 starts and stops energization to the LED indicator 67 according to the control by the main processor 140 and lights or flashes the LED indicator 67 according to timings when the camera 61 starts and ends imaging.

The control device 10 includes a power supply section 130 and operates with electric power supplied from the power supply section 130. The power supply section 130 includes a chargeable battery 132 and a power-supply control circuit 134 that performs detection of a residual capacity of the battery 132 and control of charging to the battery 132. The power-supply control circuit 134 is connected to the main processor 140 and outputs a detection value of the residual capacity of the battery 132 or a detection value of a voltage to the main processor 140. The control device 10 may supply electric power to the image display section 20 on the basis of the electric power supplied by the power supply section 130. The main processor 140 may be capable of controlling a supply state of electric power from the power supply section 130 to the sections of the control device 10 and the image display section 20.

FIG. 5 is a functional block diagram of a storing section 125 and the control section 150 configuring a control system of the control device 10. The storing section 125 shown in FIG. 5 is a logical storing section configured by the nonvolatile storing section 121 (FIG. 4) and may include the EEPROM 215. The main processor 140 executes a computer program, whereby the control section 150 and various functional sections included in the control section 150 are formed according to cooperation of software and hardware. The control section 150 and the functional sections included in the control section 150 are configured by, for example, the main processor 140, the nonvolatile storing section 121, and the memory 123.

The control section 150 executes various kinds of processing using data stored by the storing section 125 and controls the HMD 100.

The storing section 125 stores various data to be processed by the control section 150. The storing section 125 stores setting data 127 and content data 128.

The setting data 127 includes various setting values for setting the operation of the HMD 100. When the control section 150 uses parameters, a determinant, an arithmetic expression, an LUT (Look UP Table), and the like when controlling the HMD 100, the parameters, the determinant, the arithmetic expression, the LUT (Look UP Table), and the like may be included in the setting data 127.

The content data 128 is data of contents displayed by the image display section 20 according to the control by the control section 150. The content data 128 includes, for example, data of a still image and a moving image. The content data 128 may include sound data. Further, the content data 128 may include data of a plurality of images. In this case, the plurality of images are not limited to images simultaneously displayed on the image display section 20.

When contents are displayed by the image display section 20, the content data 128 may be contents of a bidirectional type for which operation of the user is received by the control device 10 and the control section 150 executes processing corresponding to the received operation. In this case, the content data 128 may include image data of a menu screen displayed when operation is received and data for deciding processing corresponding to items included in the menu screen.

The control section 150 has functions of an operating system (OS) 143, an image processing section 145, an imaging control section 147, an operation control section 149, a detection control section 151, and a display control section 153. The operation control section 149 and the detection control section 151 are equivalent to the "detecting section" in the aspect of the invention.

The function of the operating system 143 is a function of the control program stored by the storing section 125. The other sections are functions of application programs executed on the operating system 143.

The image processing section 145 generates, on the basis of image data displayed by the image display section 20, signals transmitted to the right display unit 22 and the left display unit 24. The signals generated by the image processing section 145 may be a vertical synchronization signal, a horizontal synchronization signal, a clock signal, an analog image signal, and the like.

The image processing section 145 may perform, according to necessity, resolution conversion processing for converting resolution of the image data into resolution suitable for the right display unit 22 and the left display unit 24. The image processing section 145 may execute image adjustment processing for adjusting luminance and chroma of the image data, 2D/3D conversion processing for creating 2D image data from 3D image data or creating 3D image data from 2D image data, and the like. When the image processing section 145 executes these kinds of image processing, the image processing section 145 generates a signal for displaying an image on the basis of the image data after the processing and transmits the signal to the image display section 20.

Besides being realized by the main processor 140 executing a computer program, the image processing section 145 may be configured by hardware (e.g., a DSP (Digital Signal Processor)) different from the main processor 140.

The imaging control section 147 controls the camera 61 to execute imaging, generates picked-up image data, and temporarily stores the picked-up image data in the storing section 125. When the camera 61 is configured as a camera unit including a circuit that generates picked-up image data, the imaging control section 147 acquires the picked-up image data from the camera 61 and temporarily stores the picked-up image data in the storing section 125.

The operation control section 149 detects operation in the track pad 14 and the operation section 110 and outputs operation data corresponding to the operation. For example, when the button or the like of the operation section 110 is operated, the operation control section 149 generates operation data indicating operation content and outputs the operation data to the display control section 153. The display control section 153 changes a display state according to the operation data input from the operation control section 149.

When detecting operation in the track pad 14, the operation control section 149 acquires a coordinate of an operation position in the track pad 14. The operation control section 149 generates a track of the operation position. The track of the operation position is a track of the operation position that moves while touch operation of the track pad 14 is not released, that is, while a state in which a hand or finger pointer of the user is in contact with the track pad 14 continues. The operation control section 149 outputs operation data indicating the generated track of the operation position to the display control section 153. The operation control section 149 is equivalent to the "detecting section" in the aspect of the invention.

The detection control section 151 detects operation on the basis of a detection value of the six-axis sensor 235. Specifically, the detection control section 151 detects a movement of the head of the user as operation. The six-axis sensor 235 executes sampling (measurement) at every predetermined cycle (e.g., 50 msec) and outputs an analog voltage value indicating values of measured acceleration and angular velocity.

The six-axis sensor 235 measures accelerations in the X-axis direction, the Y-axis direction, and the Z-axis direction shown in FIG. 1. The six-axis sensor 235 measures, at a measurement reference point of an incorporated measuring mechanism (not shown in the figure), angular velocities of rotations around the X axis, the Y axis, and the Z axis shown in FIG. 1. The X axis, the Y axis, and the Z axis are the directions of the three axes orthogonal to one another as shown in FIG. 1. The Z-axis direction corresponds to the vertical direction, the X-axis direction corresponds to the left-right direction of the head of the user, and the Y-axis direction corresponds to the front-rear direction of the head of the user. The Z-axis direction corresponding to the vertical direction is equivalent to the direction of the body axis of the user.

The analog voltage value output from the six-axis sensor 235 is converted into a digital voltage value by an A/D converter (not shown in the figure) and input to the control section 150.

Figure 6:
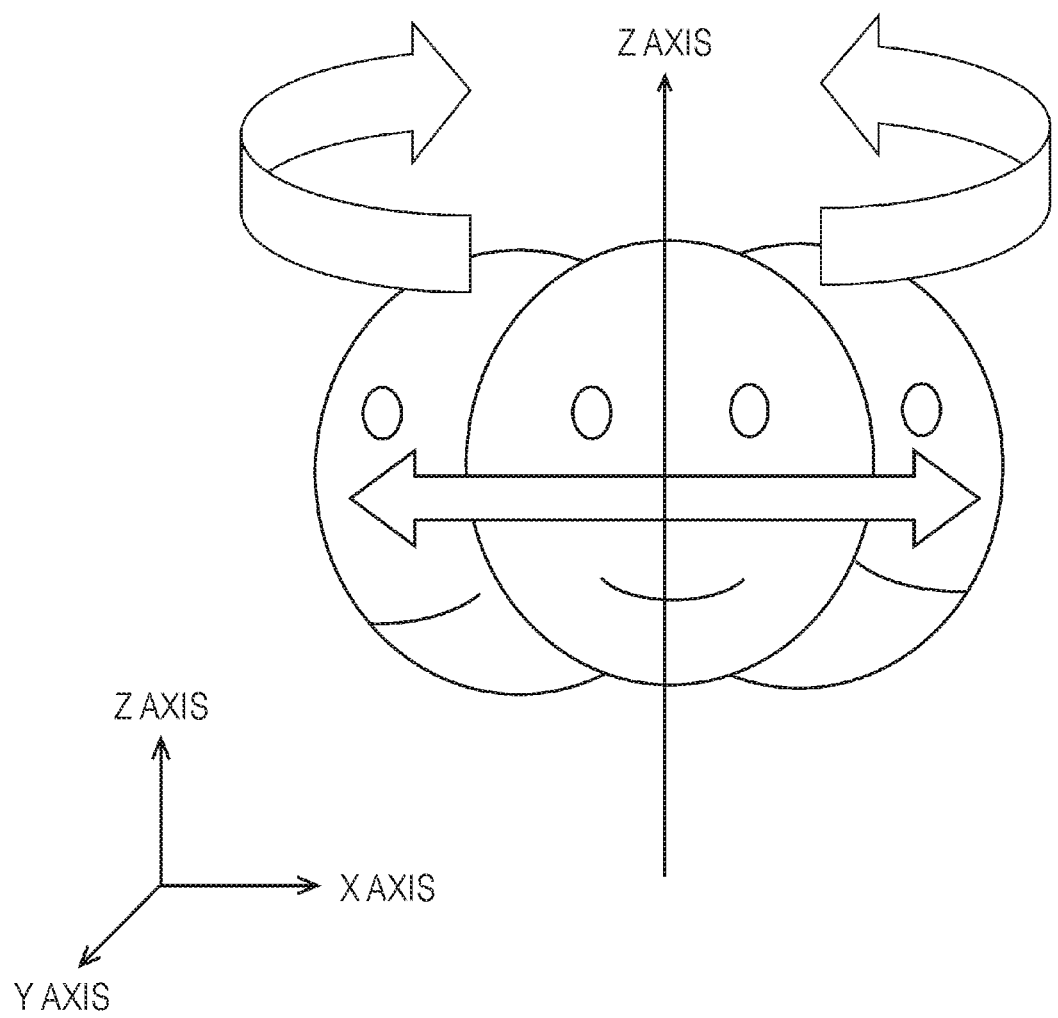
FIG. 6 is an explanatory diagram for explaining rotation of the head of a user around a Z axis.
Figure 7:
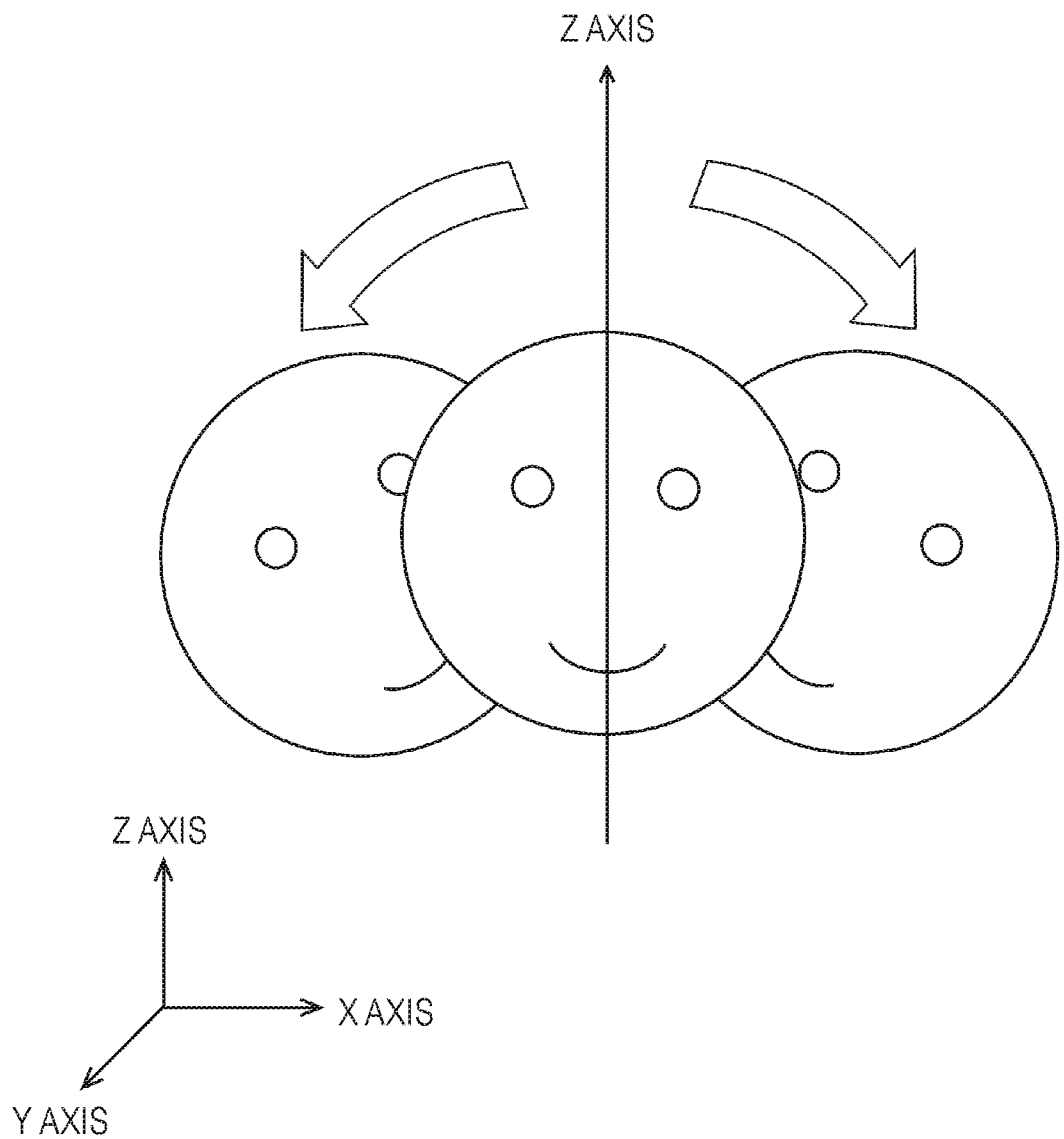
FIG. 7 is an explanatory diagram for explaining rotation of the head of the user around a Y axis.
Figure 8:
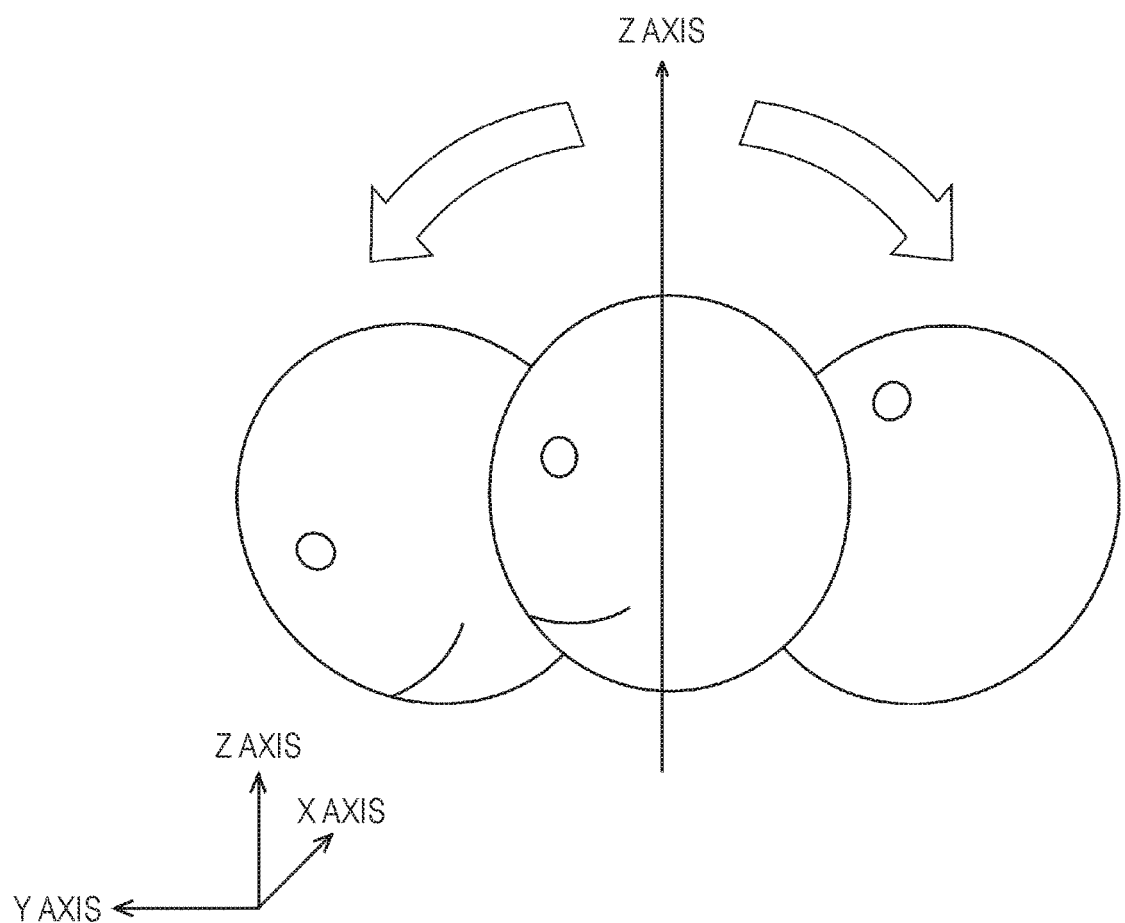
FIG. 8 is an explanatory diagram for explaining rotation of the head of the user around an X axis.

FIG. 6 is a diagram showing rotation of the head of the user around the Z axis, which is the body axis. FIG. 7 is a diagram showing rotation of the head of the user around the Y axis. FIG. 8 is a diagram showing rotation of the head of the user around the X axis.

The detection control section 151 detects, on the basis of the detection value of the six-axis sensor 235, a roll angle, which is rotation around the Z axis (the body axis), that is, a movement of the user rotating the head (the face) to the left side or the right side. The detection control section 151 detects, on the basis of the detection value of the six-axis sensor 235, a yaw angle, which is rotation around the Y axis, that is, a movement of the user tilting the head to the left direction (the left shoulder direction) or the right direction (the right shoulder direction) (a tilt of the head with respect to the body axis). The detection control section 151 detects, on the basis of the detection value of the six-axis sensor 235, a pitch angle, which is rotation around the X axis, that is, a movement of the user tilting the head to the front direction (the line of sight direction) or the rear direction (a tilt of the head with respect to the body axis). In the following explanation, a movement of the user turning the head to the left direction or the right direction and a movement of the user tilting the head to the left direction, the right direction, the upward direction, or the downward direction are collectively referred to as "movement of the head".

The detection control section 151 generates, on the basis of the detection value of the six-axis sensor 235, movement data indicating a direction in which the movement of the head is detected and an angle of the movement of the head and outputs the movement data to the display control section 153.

The display control section 153 generates control signals for controlling the right display unit 22 and the left display unit 24 and outputs the control signals to the right display unit 22 and the left display unit 24. Specifically, the display control section 153 generates control signals for controlling timing when the OLED driving circuits 225 and 245 draw images on the OLED panels 223 and 243 on the basis of the signal output by the image processing section 145 and controlling luminance of the OLED panels 223 and 243.

The display control section 153 moves, according to the operation data input from the operation control section 149, a position of a pointer 301 (FIG. 9) that the display control section 153 causes the image display section 20 to display in a display region 310. The pointer 301 indicates a pointed position in the display region 310. Instead of the pointer 301, a cursor, a mark, a character, a sign, a signage, an arrow, and a character of a game can be used as a marker. The pointer 301 is equivalent to the "marker" in the aspect of the invention.

Data indicating a moving distance and a moving direction on the operation surface is input to the display control section 153 as the operation data from the operation control section 149. The display control section 153 generates, on the basis of the input operation data, a control signal indicating a moving direction and a moving distance for moving the pointer 301 and outputs the generated control signal to the right display unit 22 and the left display unit 24.

The display control section 153 generates, on the basis of the movement data input from the detection control section 151, a control signal for moving the position of the pointer 301 displayed in the display region 310. Data indicating a direction in which the movement of the head is detected and an angle of the head is input to the display control section 153 from the detection control section 151 as the movement data. The display control section 153 determines, on the basis of the input movement data, a moving direction and a moving distance for moving the pointer 301 in the display region 310. The display control section 153 generates a control signal indicating the determined moving direction and the determined moving distance and outputs the control signal to the right display unit 22 and the left display unit 24.

The display control section 153 executes calibration and generates parameters for associating a coordinate of the display region 310 and a picked-up image of the camera 61.

While causing the image display section 20 to display an image for calibration, the display control section 153 recognizes a reference real object corresponding to the image for calibration from the picked-up image data of the camera 61 and tracks the reference real object. In this state, the user moves a position of the image for calibration on the image display section 20 via a user interface such as the track pad 14. At timing when the user senses that the image for calibration and the reference real object overlap (at least one of positions, sizes, and directions substantially coincide with each other), the user notifies the display control section 153 to that effect via the user interface. The display control section 153 generates, according to the acquired notification, parameters for associating a detection result (a position on the picked-up image data) of the reference real object at the timing and a display position of the image for calibration in the display region 310. The display control section 153 causes the storing section 125 to store the generated parameters.

The parameters are used when a target object 305 selected by the pointer 301 is specified. The control section 150 acquires the picked-up image data of the camera 61, converts a coordinate of the display region 310 where the pointer 301 is displayed into a coordinate on the picked-up image data, and specifies the target object 305.

The HMD 100 may include an interface (not shown in the figure) that connects various external devices functioning as supply sources of contents. The interface may be an interface adapted to wired connection such as a USB interface, a micro USB interface, or an interface for a memory card or may be configured by a wireless communication interface. An external device in this case is an image supply device that supplies an image to the HMD 100. A personal computer (PC), a cellular phone terminal, a portable game machine, or the like is used. In this case, the HMD 100 can output an image and sound based on the content data 128 input from the external devices.

Figure 9:
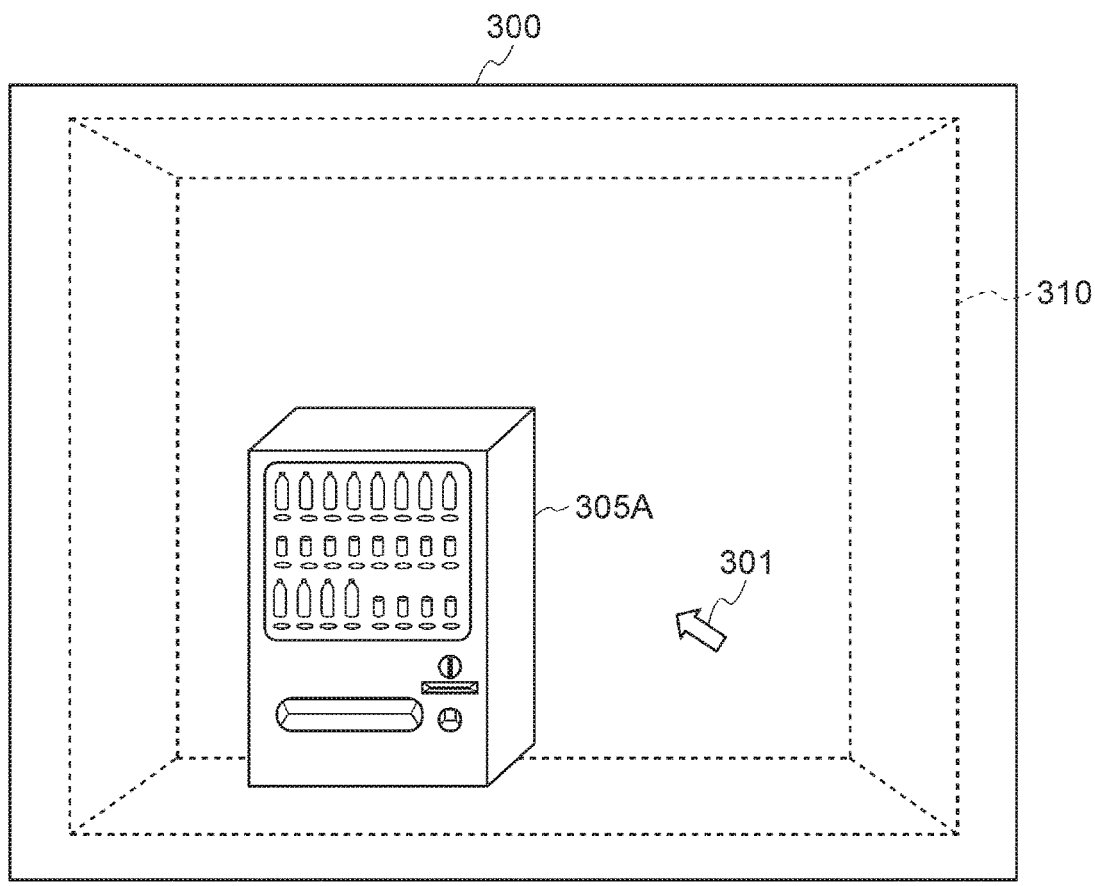
FIG. 9 is a diagram showing a field of vision of the user wearing an image display section.
Figure 9:
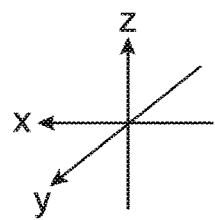

FIG. 9 is a diagram showing a field of vision 300 of the user wearing the image display section 20.

The user visually recognizes, via the image display section 20, people, buildings, roads, and other objects (which are hereinafter collectively referred to as target object 305) present in the real world (hereinafter referred to as outside scene) and an image displayed by the image display section 20 (hereinafter referred to as display image). The display image includes, for example, the pointer 301 and a still image and a moving image displayed by reproducing the content data 128. The display region 310 indicates a region where the image display section 20 is capable of displaying the display image.

The user performs first operation and second operation on the HMD 100 and moves the pointer 301 to a target position. For example, when the user attempts to purchase a beverage sold by a vending machine 305A functioning as the target object 305, the target position is a position overlapping a commodity button of a commodity of the vending machine 305A. The target position is hereinafter referred to as target.

The HMD 100 in this embodiment moves the position of the pointer 301 in different forms between when the HMD 100 moves the position of the pointer 301 according to the first operation and when the HMD 100 moves the position of the pointer 301 according to the second operation. For example, the HMD 100 changes a movement amount (e.g., a moving distance, moving speed, acceleration) of the pointer 301 between when the HMD 100 moves the pointer 301 according to the first operation and when the HMD 100 moves the pointer 301 according to the second operation.

It is assumed that a distance for moving the pointer 301 by performing operation once is set small or moving speed for moving the pointer 301 is set low. In this case, when the distance between the position of the pointer 301 and the target is long, it takes time to move the pointer 301 to the vicinity of the target. It is assumed that the distance for moving the pointer 301 by performing operation once is set large or moving speed for moving the pointer 301 is set high. In this case, it is sometimes difficult to perform fine adjustment for aligning the pointer 301 with the position of the target. Note that the target may be a display image displayed by the image display section 20 or may be the target object 305 visually recognized as an outside scene.

For this reason, the HMD 100 in this embodiment moves the pointer 301 to the target according to two kinds of operation of the first operation and the second operation in which at least one of a moving distance, moving speed, and acceleration of the pointer 301 is different.

The first operation is performed earlier than the second operation. The first operation is operation for moving the pointer 301 to the vicinity of the target in a short time. The second operation is operation for finely adjusting the position of the pointer 301 and moving the pointer 301 to the position of the target.

For example, it is assumed that the first operation and the second operation are pressing operation of a switch or a button. In this case, a moving distance, moving speed, or acceleration for moving the pointer 301 when the pressing operation by the first operation is received once is set larger than a moving distance, moving speed, or acceleration for moving the pointer 301 when the pressing operation by the second operation is received once. The moving distance, the moving speed, or the acceleration is equivalent to the "movement amount" in the aspect of the invention.

It is assumed that the first operation and the second operation are contact operation of a finger of the user on the operation surface and are operation for moving the pointer 301 according to a detected contact distance on the operation surface. In this case, a moving distance, moving speed, or acceleration of the pointer 301 corresponding to the contact distance serving as the first operation is set larger or higher than a moving distance, moving speed, or acceleration of the pointer 301 corresponding to the contact distance serving as the second operation.

It is assumed that the first operation and the second operation are contact operation on the operation surface or operation for detecting a movement of the head of the user and moving the pointer 301 and are operation for moving the pointer 301 by a distance corresponding to a detection time in which the contact operation or the movement of the head is detected. In this case, a moving distance, moving speed, or acceleration for moving the pointer 301 according to the detection time of the first operation is set larger or higher than a moving distance, moving speed, or acceleration for moving the pointer 301 according to the detection time of the second operation.

In this embodiment, operation for moving the pointer 301 according to operation of the track pad 14 is the first operation. When the track pad 14 is operated to move the pointer 301 to the position of the target, if the track pad 14 is not fixed, it is not easy to move the pointer 301 as imaged by the user. For this reason, in this embodiment, the operation of the track pad 14 is used as operation for moving the pointer 301 to the vicinity of the target.

In this embodiment, operation for detecting a movement of the head of the user as operation and moving the pointer 301 according to the detected movement is the second operation. The second operation is operation for moving the position of the pointer 301 starting from a position of the pointer 301 to which the pointer 301 is moved by the first operation. The operation of the pointer 301 performed by the user moving the head is equivalent to the "motion of the user" in the aspect of the invention. For example, when the user performs a motion of tilting the head of the user as a movement of the head, the user has to continue to tilt the head until the operation is completed. The user sometimes has to continue to maintain an unnatural posture. However, in this embodiment, since the pointer 301 is already moved to the vicinity of the target by the first operation performed before the second operation, it is possible to reduce a time for performing the second operation.

An x axis shown in FIG. 9 corresponds to the horizontal direction of the display region 310, a y axis corresponds to the depth direction of the display region 310, and a z axis corresponds to the vertical direction of the display region 310.

When rotation around of the head of the user around the X axis shown in FIG. 1, that is, a movement of tilting the head to the front and the rear with respect to the body axis is detected, for example, the control section 150 moves the pointer 301 in a z-axis direction shown in FIG. 9, that is, the vertical direction of the display region 310.

When rotation of the head of the user around the Y axis shown in FIG. 1, that is, a movement of tilting the head to the left and the right with respect to the body axis is detected, for example, the control section 150 moves the pointer 301 in a y-axis direction shown in FIG. 9, that is, the depth direction of the display region 310.

When rotation of the head of the user around the Z axis shown in FIG. 1, that is, a movement of rotating the head with respect to the body axis is detected, for example, the control section 150 moves the pointer 301 in an x-axis direction shown in FIG. 9, that is, the horizontal direction of the display region 310.

Association of the direction in which the user tilts the head and the moving direction in which the pointer 301 is moved is not limited to the association explained above and can be optionally set. For example, when the rotation of the head of the user around the Y axis shown in FIG. 7, that is, the movement of tilting the head to the left and the right with respect to the body axis is detected, the control section 150 may move the pointer 301 in the x-axis direction shown in FIG. 9, that is, the horizontal direction of the display region 310. When the rotation of the head of the user around the X axis shown in FIG. 8, that is, the movement of tilting the head to the front and the rear with respect to the body axis is detected, the control section 150 may move the pointer 301 in the y-axis direction shown in FIG. 9, that is, the depth direction of the display region 310.

In this embodiment, switching of the operation for moving the pointer 301 from the first operation to the second operation is performed by detecting whether a hand and a finger (hereinafter referred to as fingers) of the user are released from the track pad 14. While a contact on the operation surface of the track pad 14 is detected, the control section 150 determines that the user has a will to operate the track pad 14. The control section 150 moves the pointer 301 according the operation of the track pad 14. When the contact on the operation surface cannot be detected and the fingers are released from the operation surface, the control section 150 determines that the user does not have a will to operate the track pad 14. The control section 150 switches the operation for moving the pointer 301 to the second operation.

The switching from the first operation to the second operation is not limited to whether the contact on the operation surface is detected. For example, the operation may be switched from the first operation to the second operation when the preset button 11, up/down key 15, or changeover switch 16 is operated or when operation for tapping the track pad 14 a preset number of times is received. The operation may be switched from the first operation to the second operation according to sound input from the microphone 63. For example, when sound of a finger snap or a word uttered by the user is input from the microphone 63 and input sound data coincides with preset sound data, the operation may be switched from the first operation to the second operation.

In this embodiment, the operation of the pointer 301 by the track pad 14 is the first operation and the operation of the pointer 301 based on a movement of the head of the user is the second operation. However, the first operation and the second operation are not limited to these kinds of operation. For example, the operation for detecting a movement of the head of the user and moving the pointer 301 may be the first operation and the operation of the pointer 301 by the track pad 14 may be the second operation. A hand sign or a gesture may be used as either one of the first operation and the second operation. The hand sign or the gesture is equivalent to the "motion of the user" in the aspect of the invention. When the first or second operation is performed by the hand sign or the gesture, a dictionary used to specify the hand sign or the gesture is stored beforehand in the storing section 125. For example, in the dictionary, data indicating positions and shapes of fingers are registered for each of hand signs. When the gestures are gestures for taking preset shapes (forms) of a hand in preset order, data indicating positions, shapes, and the like of fingers in the shapes (forms) are registered in the dictionary for each of the gestures. The control section 150 detects, from a picked-up image of the camera 61, a region where the hand and the finger of the user are imaged (hereinafter, finger region), detects a shape and a position of the fingers from the detected finger region, and recognizes a hand sign or a gesture according to matching with the data registered in the dictionary.

The control section 150 may detect, as either one of the first operation and the second operation, a movement of nails of a hand of the user, a finger ring worn on a finger of the user, or a bracelet, a watch, or a band worn on an arm of the user. The control section 150 detects the movement of the nails of the hand of the user, the ring worn on the finger of the user, or the bracelet, the watch, or the band worn on the arm of the user from a picked-up image of the camera 61 and moves the pointer 301 according to the detected movement.

The control section 150 includes a first operation mode and a second operation mode as operation modes and switches and executes the operation modes.

The first operation mode is a mode for moving the pointer 301 to correspond to an outside scene seen via the image display section 20. More specifically, in the first operation mode, the control section 150 moves the pointer 301 on the basis of the target object 305 present in the outside scene seen via the image display section 20. For example, when the user tilts the head with the second operation, the display region 310 tilts according to the tilt of the head. However, the target object 305 present in the outside scene does not tilt. If the operation mode is the first operation mode, when operation for moving the pointer 301 to the left or the right is input, the control section 150 moves the pointer 301 in the left or the right direction of the horizontal direction horizontal to the ground (hereinafter simply referred to as horizontal direction). If the operation mode is the first operation mode, when operation for moving the pointer 301 upward or downward is input, the control section 150 moves the pointer 301 in the upward direction or the downward direction of the vertical direction.

In the second operation mode, the control section 150 moves the pointer 301 in a form different from the movement corresponding to the outside scene.

More specifically, in the second operation mode, the control section 150 moves the pointer 301 on the basis of a display image displayed in the display region 310. When the user tilts the head with the second operation, the display region 310 also tilts according to the tilt of the head. For this reason, if the operation mode is the second operation mode, when operation for moving the pointer 301 to the left or the right is input, the control section 150 moves the pointer 301 in a direction parallel to the x axis, which is the horizontal direction of the tilted display region 310. If the operation mode is the second operation mode, when operation for moving the pointer 301 upward or downward is input, the control section 150 moves the pointer 301 in a direction parallel to the z axis, which is the vertical direction of the tilted display region 310.

If the operation mode is the first operation mode, the control section 150 controls a movement of the pointer 301 to make it easy to align the pointer 301 with the target object 305. If the operation mode is the second operation mode, the control section 150 controls the movement of the pointer 301 to make it easy to align the pointer 301 with the display image.

For example, if the operation mode is the first operation mode, the control section 150 detects the target object 305 from picked-up image data of the camera 61 and specifies the target object 305 overlapping a display position of the pointer 301. For example, when the target object 305 and the display image displayed to be superimposed on the target object 305 overlap the display position of the pointer 301, the control section 150 specifies the target object 305 overlapping the display position of the pointer 301.

If the operation mode is the second operation mode, the control section 150 specifies a plurality of display images displayed in the display region 310 and specifies a display image overlapping the position of the pointer 301 out of the target object 305 visually recognized in the display region 310. For example, when the target object 305 and the display image displayed to be superimposed on the target object 305 overlap the display position of the pointer 301, the control section 150 specifies the display image overlapping the display position of the pointer 301.

Figure 10:
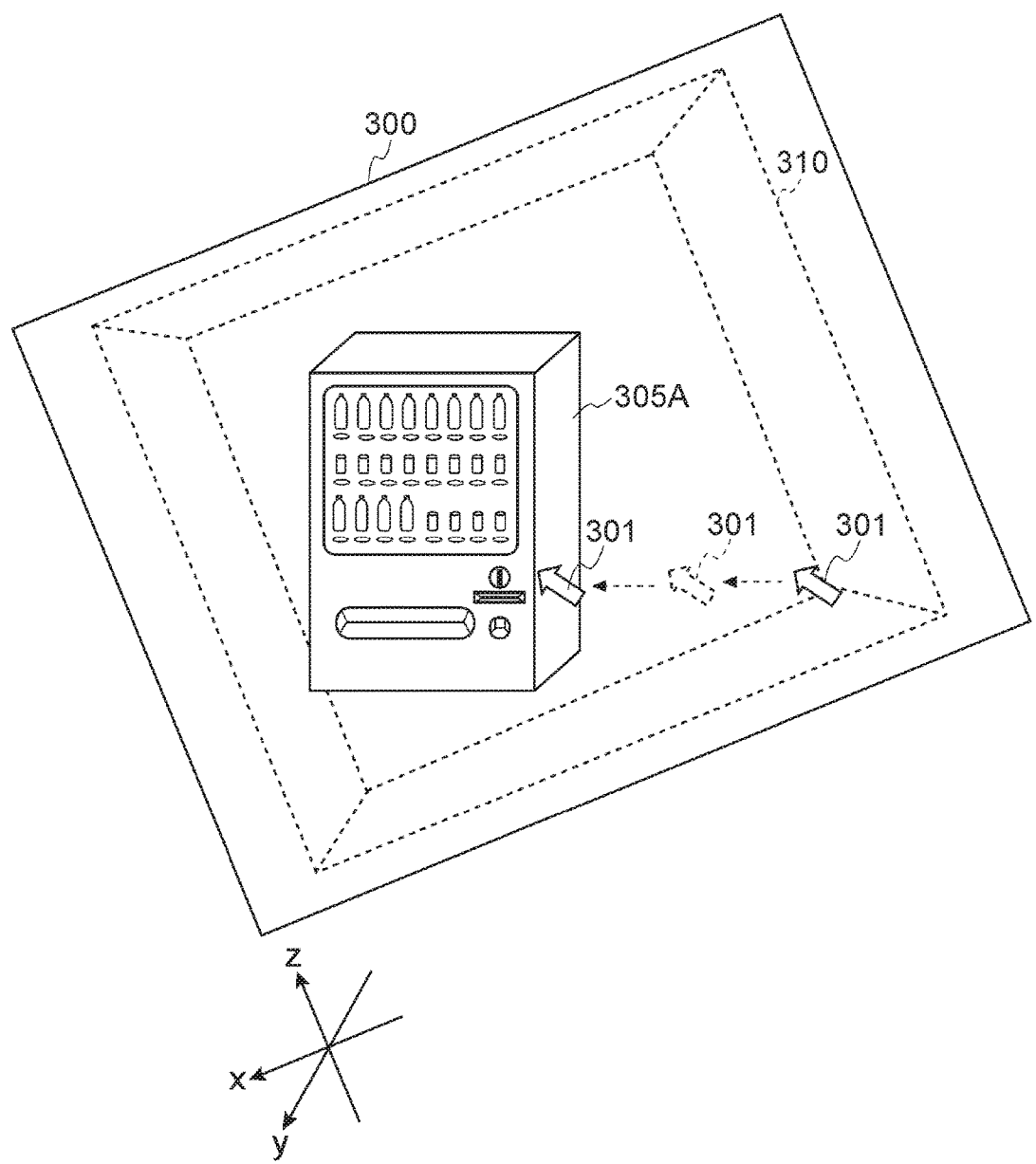
FIG. 10 is an explanatory diagram for explaining the field of vision of the user wearing the image display section.
Figure 11:
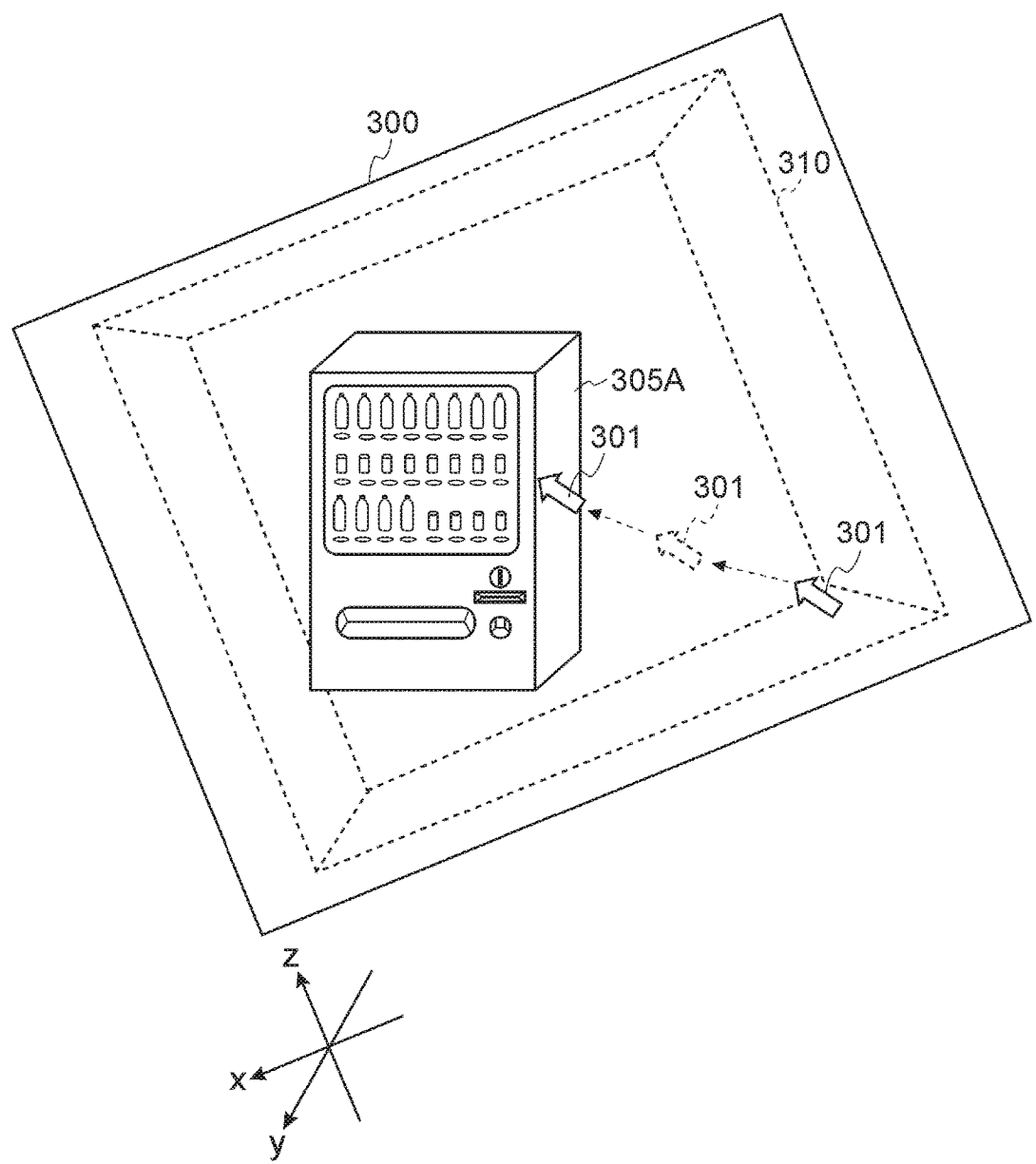
FIG. 11 is an explanatory diagram for explaining the field of vision of the user wearing the image display section.

FIGS. 10 and 11 are explanatory diagrams for explaining a field of vision of the user wearing the image display section 20. In particular, in FIGS. 10 and 11, a state is shown in which the vending machine 305A is seen as the target object 305 included in the outside scene.

When the user operates the pointer 301 with the second operation, the user sometimes performs a motion of tilting the head to the left shoulder side or the right shoulder side (see FIG. 7). When the user rotates the head around the Y axis and tilts the head to the left shoulder side, the display region 310 visually recognized by the user also tilts according to the tilt of the head. The display image displayed in the display region 310 is displayed to tilt as well. In this case, the display region 310 of the image display section 20 also tilts according to the tilt of the head. However, the target object 305 seen via the image display section 20 does not tilt.

For example, when the user tilts the head to the left shoulder side, the display region 310 tilts to fall on the left side and rise on the right side. At this point, if the operation mode is the first operation mode, the control section 150 moves the pointer 301 in the horizontal direction rather than moving the pointer 301 in the lateral direction of the tilted display region 310. The control section 150 detects the tilt of the head on the basis of a detection value of the six-axis sensor 235 and corrects a moving direction of the pointer 301 on the basis of the detected tilt of the head. In FIG. 10, a state is shown in which the pointer 301 is moved in the horizontal direction with respect to the vending machine 305A functioning as the target object 305.

The user can move the pointer 301 in the vertical direction of the display region 310, that is, the upward direction by performing a movement of tilting the head to the front and the rear with respect to the body axis after returning the tilted head to the original position.

In a state in which the user tilts the head to the left shoulder side or the right shoulder side and the display region 310 is visually recognized in a tilted state, when the user desires to move the pointer 301 in the z-axis direction of the display region 310, the user may perform the operation by the track pad 14 simultaneously with the operation by the head. In a state in which the motion of tilting the head to the left shoulder side or the right shoulder side is detected, for example, when receiving operation for moving the pointer 301 in the vertical direction according to the operation of the track pad 14, the control section 150 moves the pointer 301 according to both the kinds of operation. That is, the control section 150 simultaneously moves the pointer 301 in the horizontal direction and the vertical direction and moves the pointer 301 in an oblique upward direction as shown in FIG. 11.

Figure 12:
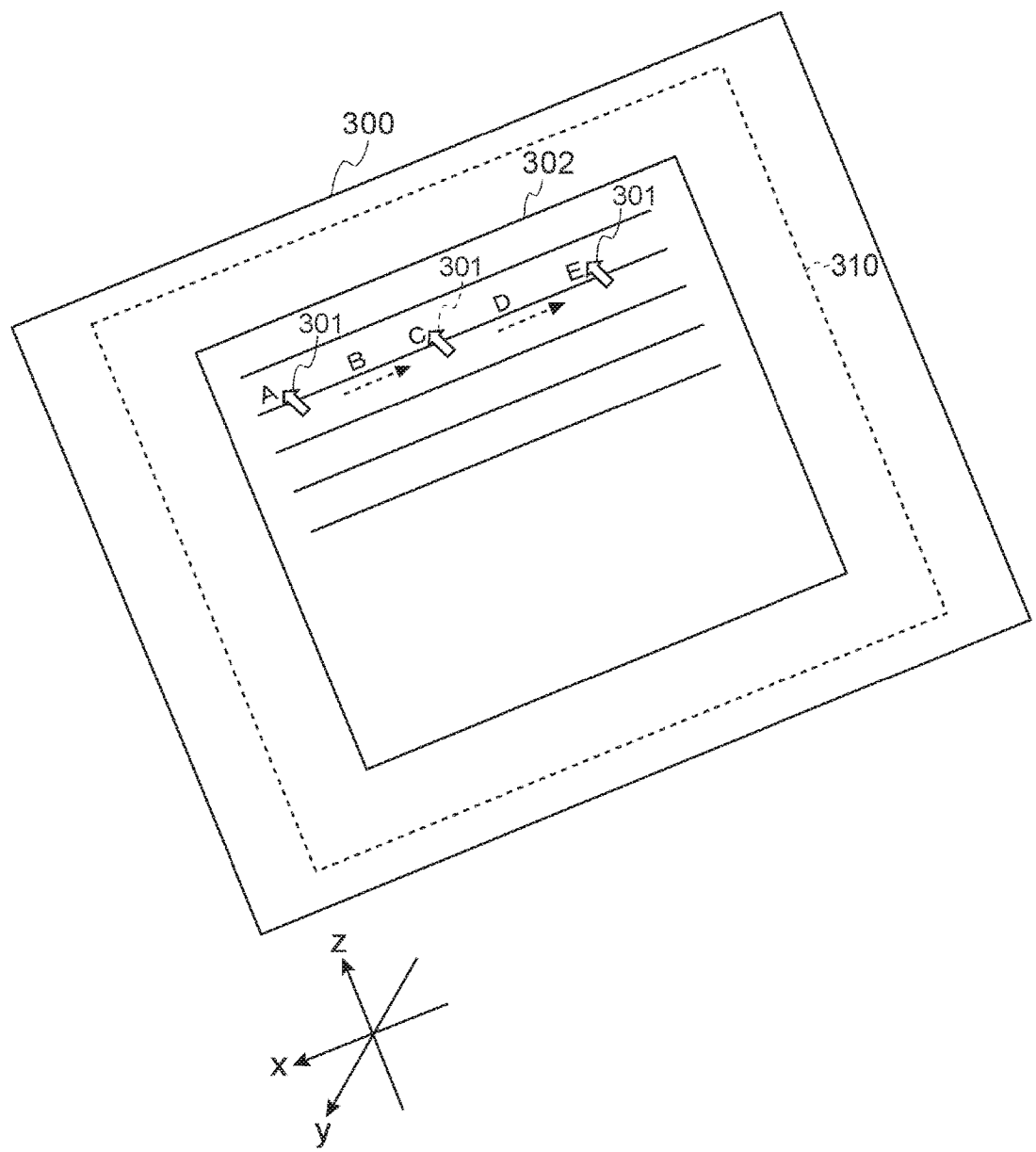
FIG. 12 is an explanatory diagram for explaining the field of vision of the user wearing the image display section.

FIG. 12 is an explanatory diagram for explaining the field of vision of the user wearing the image display section 20. In particular, in FIG. 12, a state is shown in which a display screen 302 of word processor software is displayed in the display region 310.

When the head of the user tilts, the image display section 20 worn on the head of the user also tilts. For this reason, a display image displayed by the image display section 20 is displayed to tilt as well. If the operation mode is the second operation mode, the control section 150 moves the pointer 301 in a direction parallel to the x axis, which is the lateral direction of the display region 310. In FIG. 12, a state is shown in which the pointer 301 is moved according to a tilt of the display screen 302 of the word processor software.

The control section 150 may cause the image display section 20 to display, in the display region 310, indication indicating whether the operation mode of the HMD 100 is the first operation mode or the second operation mode.

For example, if the operation mode of the HMD 100 is the first operation mode, the control section 150 may cause the image display section 20 to display "first operation mode" in the display region 310. If the operation mode is the second operation mode, the control section 150 may cause the image display section 20 to display "second operation mode" in the display region 310.

The control section 150 may change a color of the display image according to whether the operation mode is the first operation mode or the second operation mode.

Figure 13:
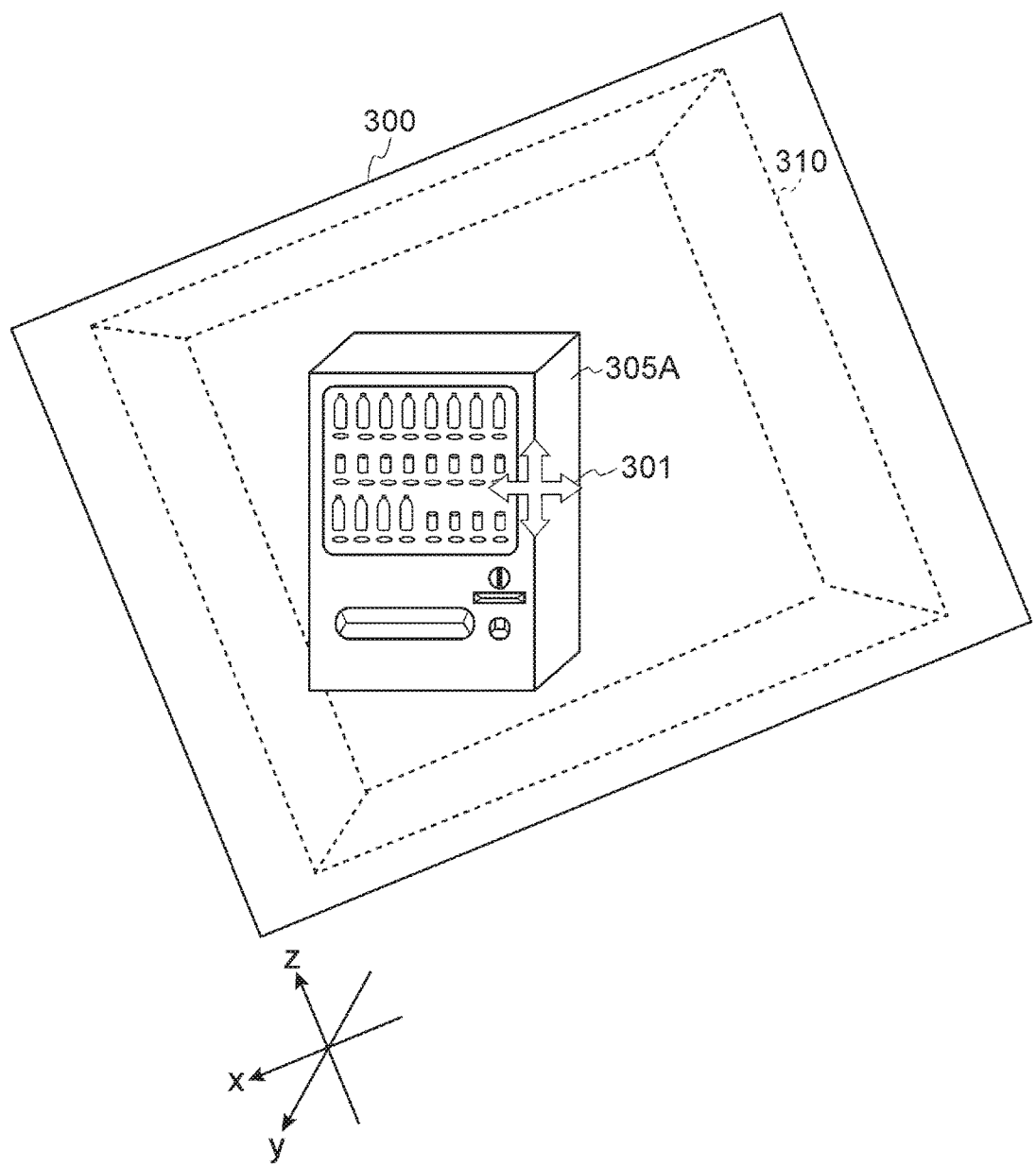
FIG. 13 is an explanatory diagram for explaining the field of vision of the user wearing the image display section.
Figure 14:
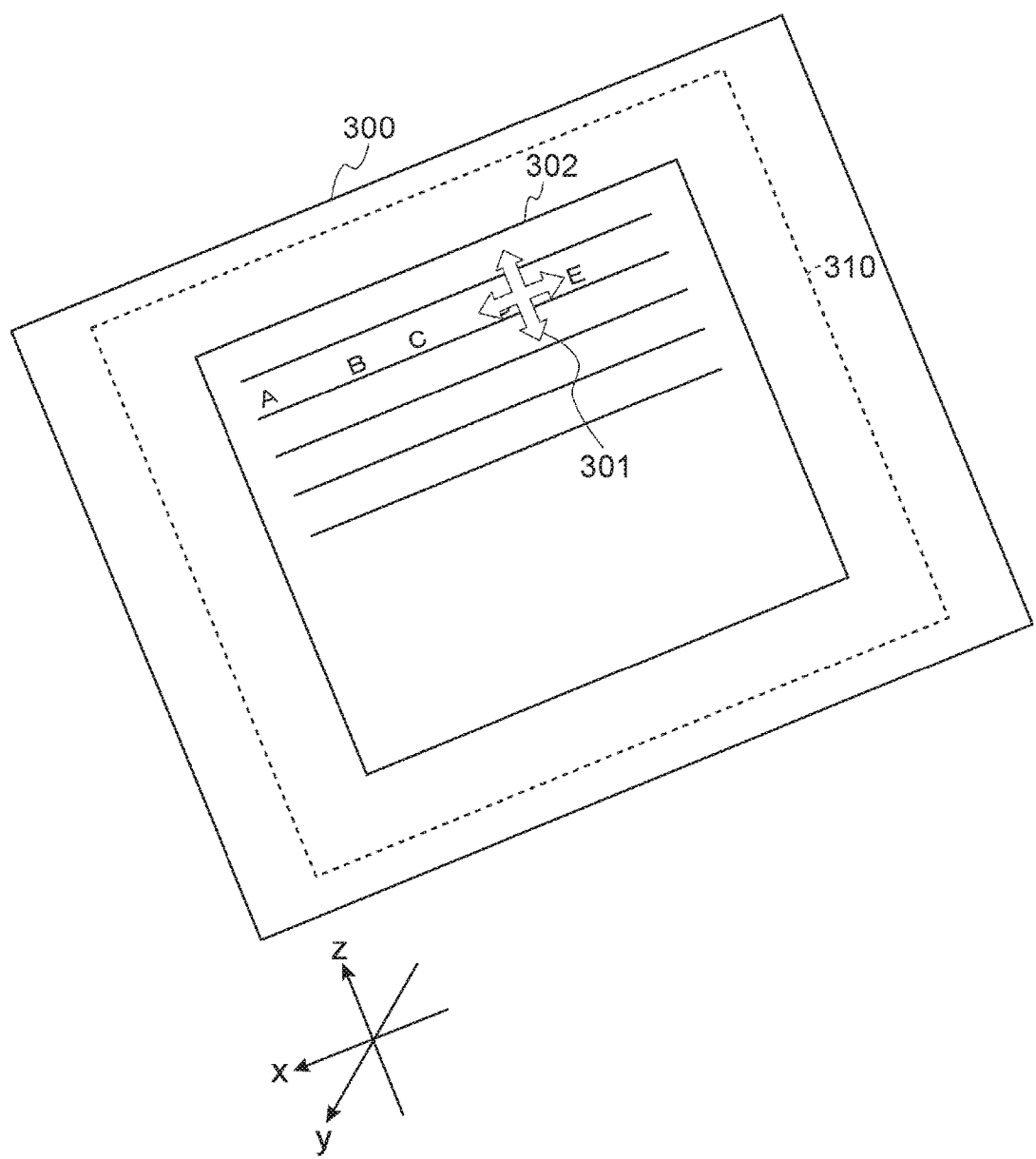
FIG. 14 is an explanatory diagram for explaining the field of vision of the user wearing the image display section.

FIGS. 13 and 14 are explanatory diagrams for explaining the field of vision of the user wearing the image display section 20. In particular, FIG. 13 is a diagram showing a moving direction of the pointer 301 in the case in which the operation mode is the first operation mode. FIG. 14 is a diagram showing a moving direction of the pointer 301 in the case in which the operation mode is the second operation mode.

When the pointer 301 is in a standstill state, the control section 150 may cause the image display section 20 to display, as the pointer 301, an arrow indicating a direction in which the pointer 301 is movable. For example, if the operation mode of the HMD 100 is the first operation mode, the control section 150 causes the image display section 20 to display the pointer 301 on which arrows indicating four directions of a vertical upward direction, a vertical downward direction, a horizontal left direction, and a horizontal right direction are displayed as shown in FIG. 13. If the operation mode of the HMD 100 is the second operation mode, the control section 150 causes the image display section 20 to display the pointer 301 on which arrows indicating vertical direction upward and vertical direction downward of the display region 310 and arrows indicating horizontal direction leftward and horizontal direction rightward of the display region 310 are displayed as shown in FIG. 14.

Instead of the display of the arrows indicating the moving directions, the control section 150 may cause the image display section 20 to display auxiliary signs or auxiliary lines indicating the moving directions.

Figure 15:
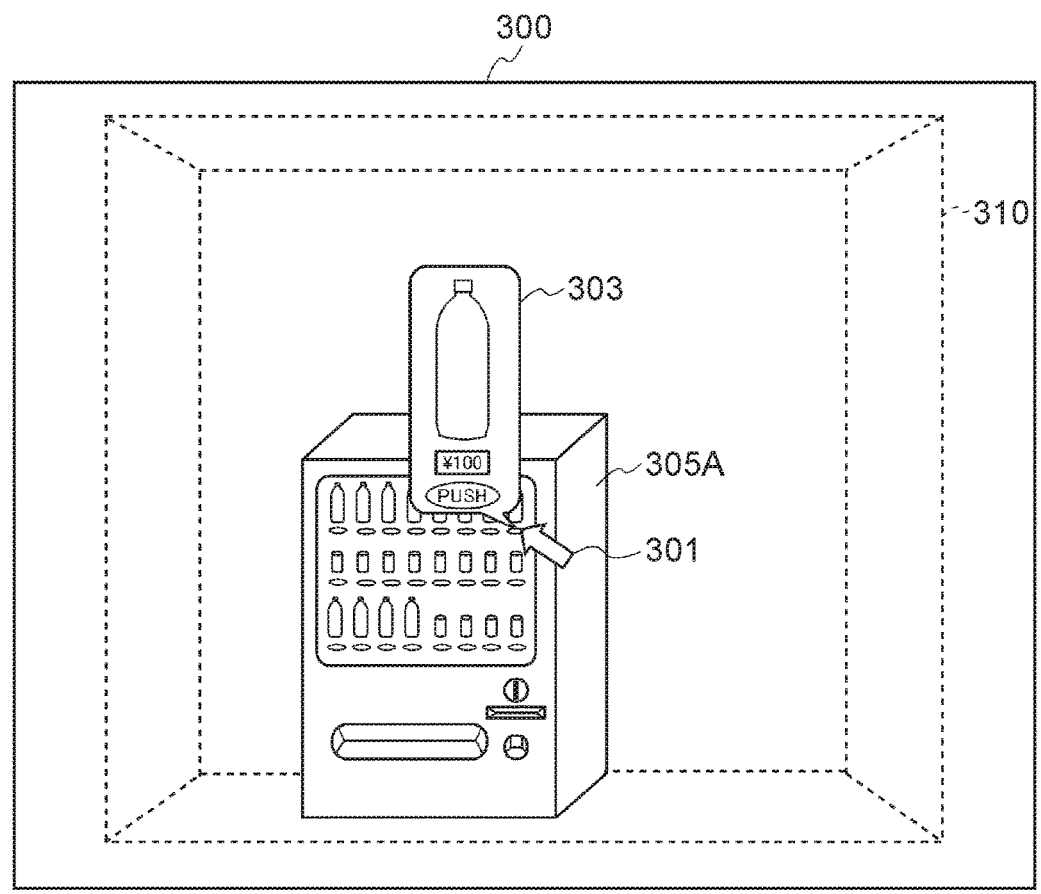
FIG. 15 is an explanatory diagram for explaining the field of vision of the user wearing the image display section.
Figure 15:
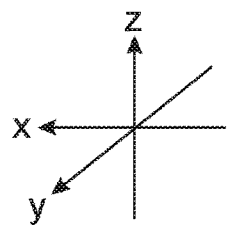
Figure 16:
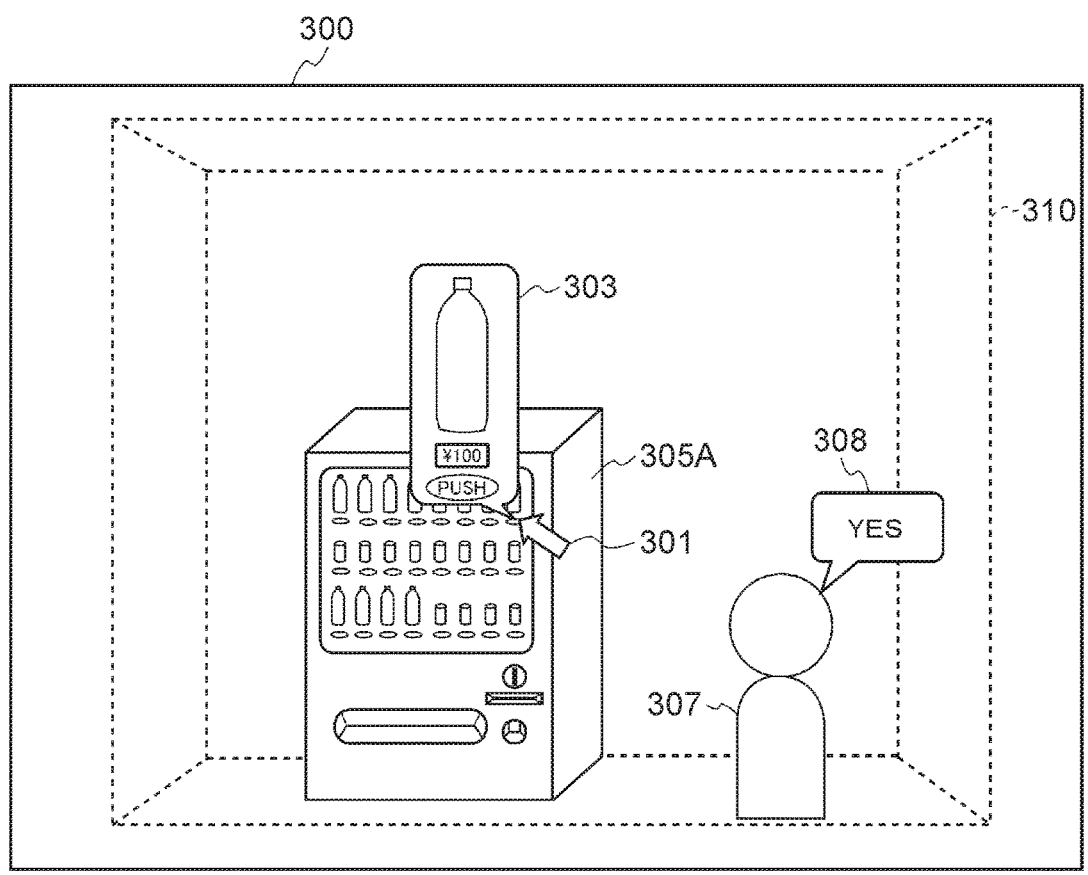
FIG. 16 is an explanatory diagram for explaining the field of vision of the user wearing the image display section.
Figure 16:
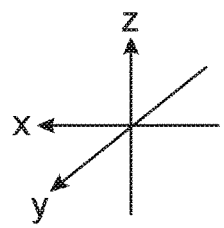

FIGS. 15 and 16 are explanatory diagrams for explaining the field of vision of the user wearing the image display section 20. In particular, FIGS. 15 and 16 are diagrams showing a display image displayed when the pointer 301 is moved to the vicinity of a target by the first operation.

When the pointer 301 is operated by the first operation and moved to the vicinity of the target, as shown in FIG. 15, the target present near the pointer 301 is enlarged and displayed.

The control section 150 acquires picked-up image data picked up by the camera 61 and detects the target object 305 from the acquired picked-up image data. When detecting the target object 305 within a preset range from the display position of the pointer 301, the control section 150 extracts an image of the target object 305 from the picked-up image data, enlarges the extracted image of the target object 305, and causes the image display section 20 to display the image in the display region 310.

When the target object 305 is detected within the preset range from the display position of the pointer 301, the control section 150 may cause the image display section 20 to display, in the display region 310, indication for inquiring the user whether the image of the target object 305 is enlarged and displayed. When receiving, with the button 11 or the track pad 14, an instruction to enlarge and display the image of the target object 305, the control section 150 causes the image display section 20 to enlarge and display the image of the target object 305 in the display region 310. The enlarged and displayed image of the target object 305 is referred to as enlarged image 303.

In a state in which the enlarged image 303 is displayed, the user finely adjusts the position of the pointer 301 with the second operation such that the pointer 301 overlaps the target. When the pointer 301 overlaps the target, the user performs deciding operation. When receiving the deciding operation, the control section 150 determines that the target overlapping the display position of the pointer 301 is selected. As the deciding operation, operation other than the second operation, that is, the operation for detecting a movement of the head of the user and moving the pointer 301 is used. The deciding operation may be, for example, operation for tapping the operation surface of the track pad 14 or may be operation of the button 11, the up/down key 15, the changeover switch 16, or the like.

The control section 150 may cause the image display section 20 to display, in the display region 310, an image 307 indicating the user as shown in FIG. 16. As the user image 307, for example, an image of the user picked up beforehand or an icon, an avatar, or the like indicating the user can be used.

When the enlarged image 303 is displayed in the display region 310, the user performs predetermined operation to input, to the HMD 100, information indicating whether the target object 305 displayed as the enlarged image 303 is the target. The predetermined operation includes, as operation indicating affirmation, for example, an OK sign performed by fingers of a hand and a movement of rotating the head with respect to the X axis and moving the head in the front-rear direction, that is, a "nodding" motion. The predetermined operation includes, as operation indicating negation, for example, a sign for crossing index fingers of both hands in front of the face of the user and a movement of rotating the head with respect to the Z axis and moving the head in the left-right direction, that is, a "head swinging" motion.

The control section 150 may cause the image display section 20 to display, in the vicinity of the user image 307, a detection result of the predetermined operation performed by the user. In FIG. 16, an example is shown in which, when the operation indicating affirmation is detected as the predetermined operation, pop display 308 is displayed in association with the user image 307.

When receiving a signal transmitted from an external device wirelessly connected to the HMD 100, the HMD 100 may determine that the deciding operation is received. As the external device, for example, a wearable terminal worn on an arm or the like of the user can be used. When the pointer 301 overlaps the target, the user inputs preset operation to the wearable terminal. When receiving the preset operation, the wearable terminal transmits a predetermined signal to the HMD 100. When receiving the predetermined signal from the wearable terminal, the control section 150 of the HMD 100 determines that the deciding operation is received.

Figure 17:
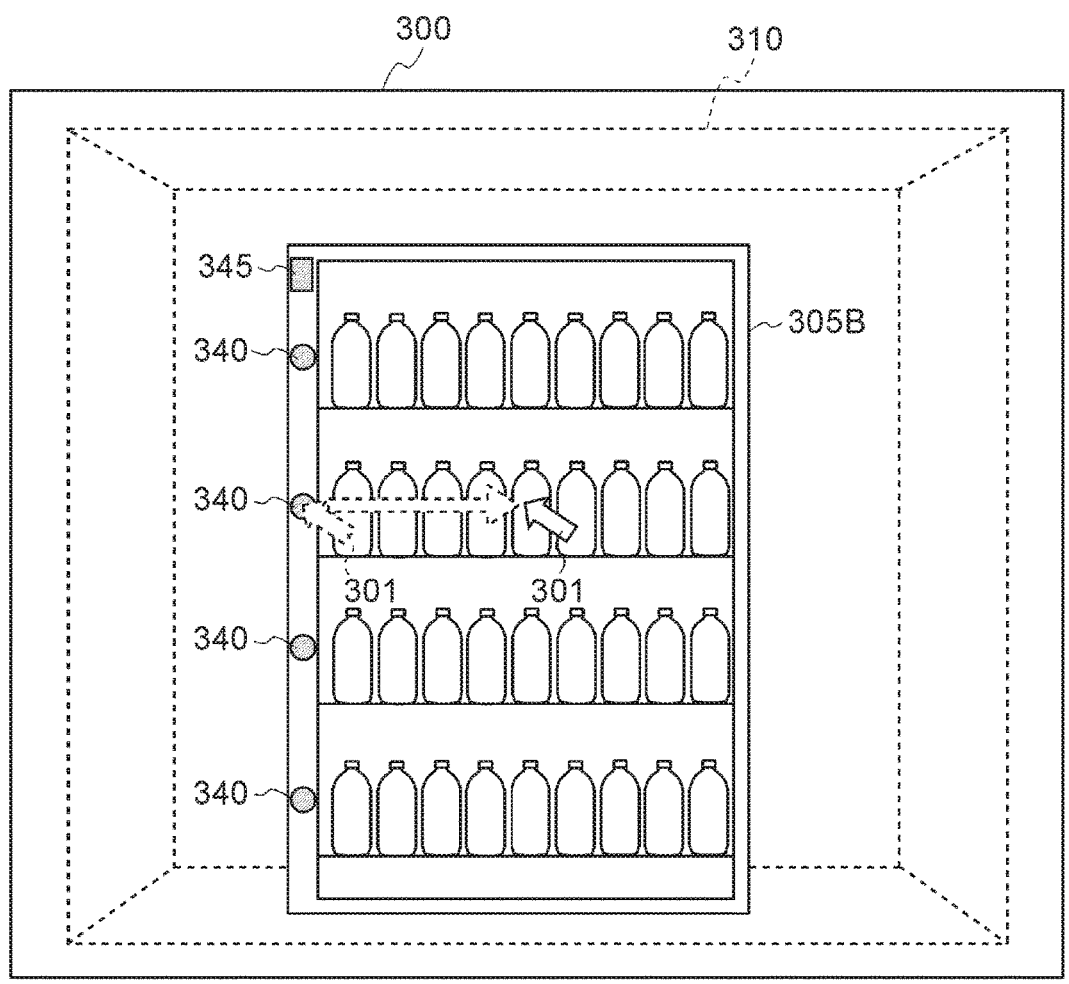
FIG. 17 is an explanatory diagram for explaining the field of vision of the user wearing the image display section.
Figure 17:
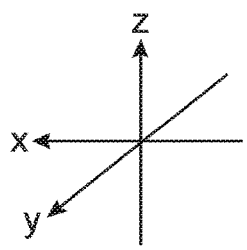

FIG. 17 is an explanatory diagram for explaining the field of vision of the user wearing the image display section 20. In particular, FIG. 17 is a diagram showing a state in which a refrigeration showcase 305B set in a store can be visually recognized as the target object 305.

In the refrigeration showcase 305B, QR codes (registered trademark) 340 functioning as identification marks are provided to correspond to shelves of the refrigeration showcase 305B. A beacon transmitter 345 that transmits a beacon signal is set in the refrigeration showcase 305B. The control section 150 images, with the camera 61, the QR codes 340 set on the shelves on which commodities are displayed. Note that, in this embodiment, the identification marks are the QR codes 340. However, the identification marks may be barcodes, AR markers, or the like.

The control section 150 detects the QR codes 340 from the picked-up image data of the camera 61 and causes the image display section 20 to display images (hereinafter referred to as target images) having a predetermined shape in positions corresponding to the QR codes 340 of the shelves. The camera 61 is equivalent to the "mark detecting section" in the aspect of the invention. The target images may be images of any color and any shape as long as the images can be easily recognized by the user. When the target images are displayed to correspond to the shelves, the user places a fingertip on the target image of the shelf on which a commodity that the user desires to purchase is displayed. The control section 150 detects the fingertip of the user from the picked-up image data of the camera 61 and moves the pointer 301 to a position of the target image corresponding to the detected fingertip.

When the pointer 301 is displayed on the target image of the shelf on which the commodity that the user desires to purchase is displayed, with the operation of the track pad 14 or the operation by the head, the user moves the pointer 301 to the position of the commodity that the user desires to purchase. Thereafter, for example, when receiving the preset operation as the operation for tapping the operation surface of the track pad or the deciding operation such as nodding of the user, the control section 150 performs communication with a server device set in the store and performs purchase processing for the commodity visually recognized over the pointer 301.

In the above explanation, a plurality of QR codes 340 are imaged in the picked-up image data of the camera 61. However, the user may operate the operation section 110 and image only the QR code 340 of the shelf on which the commodity that the user desires to purchase is displayed. In this case, the control section 150 moves the pointer 301 to the shelf of the imaged QR code 340. Thereafter, with the operation of the track pad 14 or the operation by the head, the user moves the pointer 301 to the position of the commodity that the user desires to purchase.

When the plurality of QR codes 340 are imaged in the picked-up image data of the camera 61, the control section 150 causes the image display section 20 to display the picked-up image data in the display region 310 and causes the user to perform operation for selecting any one of the plurality of QR codes 340. For example, when the picked-up image data is displayed in the display region 310, the user selects any one QR code 340 with operation of the operation section 110 or the operation by the head. When receiving the operation for selecting the QR code 340, the control section 150 moves the pointer 301 to a position of the refrigeration showcase 305B where the selected QR code 340 is affixed. Thereafter, with the operation of the track pad 14 or the operation by the head, the user moves the pointer 301 to the position of the commodity that the user desires to purchase.

The control section 150 is connected to, on the basis of information included in the beacon signal received from the beacon transmitter 345 set in the shelf of the refrigeration showcase 305B, the beacon transmitter 345 and the server device (not shown in the figure) set in the store. The control section 150 receives additional information transmitted from the connected beacon transmitter 345 and the connected server device. The control section 150 causes the image display section 20 to display the received additional information in the display region 310. The additional information includes, for example, discount information indicating that, when the user purchases a sandwich together with a beverage, the user can receive a discount service.

Figure 18:
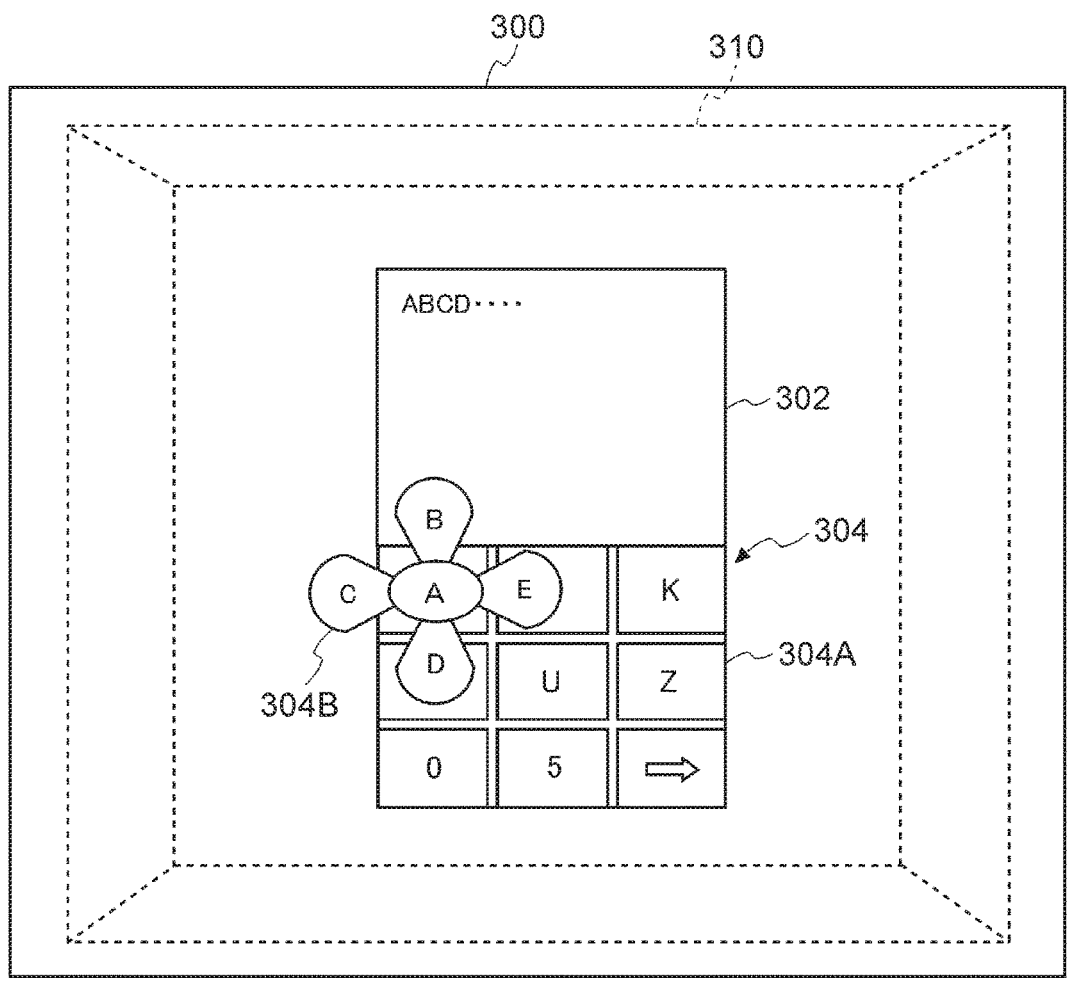
FIG. 18 is an explanatory diagram for explaining the field of vision of the user wearing the image display section.
Figure 18:
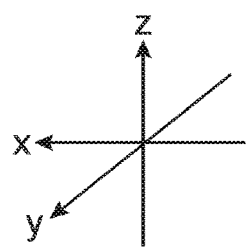

FIG. 18 is an explanatory diagram for explaining the field of vision of the user wearing the image display section 20. In particular, in FIG. 18, a state is shown in which the display screen 302 of the word processor software and a software keyboard 304 are displayed in the field of vision 300 of the user.

The user moves the pointer 301 onto a key of the software keyboard 304 with the operation of the track pad 14 serving as the first operation. When receiving the operation of the track pad 14, the control section 150 moves the display position of the pointer 301 on the display region 310 according to the received operation.

The software keyboard 304 includes a first key screen 304A and a second key screen 304B. On the second key screen 304B, a plurality of keys associated with keys displayed on the first key screen 304A are displayed. Keys of "A", "F", "K", "P", "U", and "Z" are displayed on the first key screen 304A. For example, when the key "A" of the first key screen 304A is selected, the control section 150 causes the image display section 20 to display, as the second key screen 304B, characters "A", "B", "C", "D", and "E". When the key "F" of the first key screen 304A is selected, the control section 150 causes the image display section 20 to display, as the second key screen 304B, characters "F", "G", "H", "I", and "J".

When the pointer 301 is located on the key of the first key screen 304A for a fixed time or more, the control section 150 causes the image display section 20 to display the second key screen 304B associated with the key on which the pointer 301 is located. When the second key screen 304B is displayed in the display region 310, the user moves the head in the direction of the key that the user desires to enter. For example, in an example shown in FIG. 18, the character "B" is selected when the user moves the head in the upward direction, the character "D" is selected when the user moves the head in the downward direction, the character "C" is selected when the user turns the head to the left direction, and the character "E" is selected when the user turns the head to the right direction. The character "A" is selected when the user tilts the head to the left shoulder side or the right shoulder side.

Figure 19:
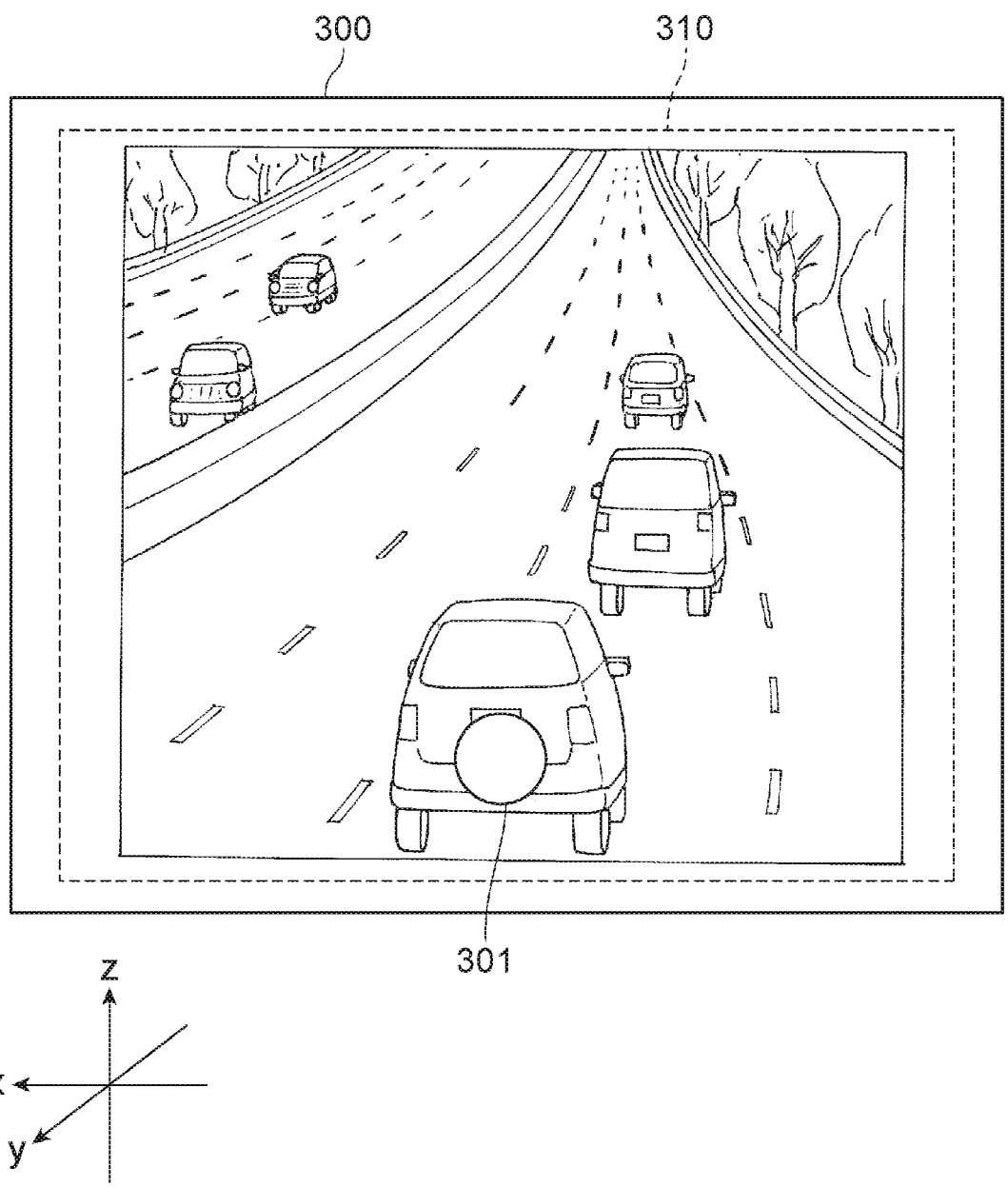
FIG. 19 is an explanatory diagram for explaining the field of vision of the user wearing the image display section.

FIG. 19 is an explanatory diagram for explaining the field of vision of the user wearing the image display section 20. In particular, FIG. 19 is a diagram showing the field of vision 300 of a driver who drives a car (a moving object) in a state in which the driver wears the HMD 100.

When a finger detected by picked-up image data of the camera 61 points the same position for a fixed time or more, the control section 150 causes the image display section 20 to display the pointer 301 in the position corresponding to the fingertip of the finger. In FIG. 19, a state is shown in which the pointer 301 is displayed in a position corresponding to a vehicle traveling ahead. The display position of the pointer 301 can be finely adjusted according to a movement of the head of the user or a sound input by the microphone 63. The control section 150 receives voice of the user input from the microphone 63, analyzes the input voice, and analyzes an instruction from the user. For example, when an analysis result of the voice is "right direction", the control section 150 moves the display position of the pointer 301 to the right.

The control section 150 may detect a vehicle functioning as the moving object from the picked-up image data of the camera 61 and cause the image display section 20 to display the pointer 301 in a position of the display region 310 corresponding to the detected vehicle.

In a state in which the pointer 301 is displayed in the position corresponding to the vehicle traveling ahead, when receiving an instruction for "tracking" through the voice input, the control section 150 causes the pointer 301 to track the vehicle traveling ahead.

Line of sight sensors (not shown in the figure) may be mounted on the HMD 100. When the target object 305 is present in a line of sight direction detected by the line of sight sensors, the control section 150 may cause the image display section 20 to display the pointer 301. The line of sight sensors are explained.

A pair of line of sight sensors is provided in center positions of the right light guide plate 26 and the left light guide plate 28 to respectively correspond to the right eye RE and the left eye LE of the user. The line of sight sensors are configured by, for example, a pair of cameras that respectively images the right eye RE and the left eye LE of the user. The line of sight sensors performs imaging according to the control by the control section 150. The control section 150 detects reflected lights on the eyeball surfaces and images of the pupils of the right eye RE and the left eye LE from the picked-up image data and specifies a line of sight direction.

The switching of the operation mode between the first operation mode and the second operation mode may be performed when operation of the button 11, the up/down key 15, the changeover switch 16, or the like is received. The switching of the operation mode may be performed when the operation for tapping the track pad 14 for a preset number of times is received.

The first operation mode and the second operation mode may be switched according to whether the target object 305 is present in the line of sight direction detected by the line of sight sensors mounted on the HMD 100 or whether a display image is present.

When the target object 305 is present in the line of sight direction detected by the line of sight sensors, the control section 150 sets the operation mode of the HMD 100 to the first operation mode. When the display image is present in the line of sight direction detected by the line of sight sensors, the control section 150 sets the operation mode of the HMD 100 to the second operation mode.

Figure 20:
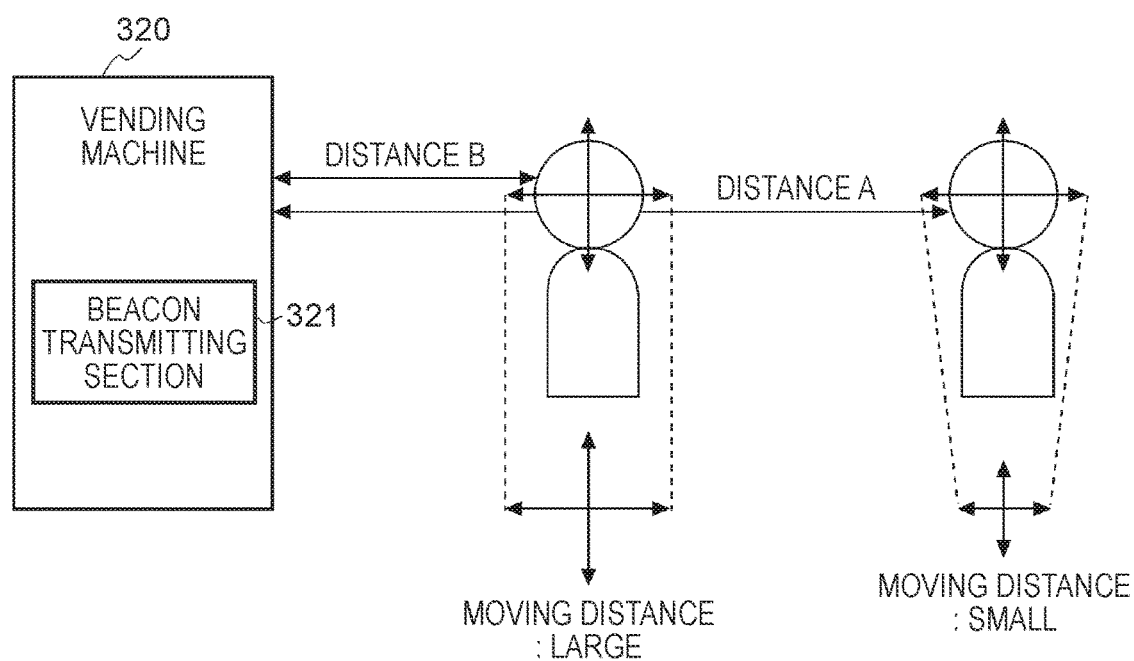
FIG. 20 is an explanatory diagram for explaining a relation between a distance to a target and a moving distance of a pointer.

FIG. 20 is a diagram showing a relation between a distance to the target and a moving distance of the pointer 301.

In the above explanation, the moving distance, the moving speed, and the acceleration of the pointer 301 are changed between when the pointer 301 is operated by the first operation and when the pointer 301 is operated by the second operation.

As operation other than the above, the moving distance, the moving speed, and the acceleration, which are the forms of the movement of the pointer 301, may be changed according to the distance between the HMD 100 and the target. For example, when, as shown in FIG. 20, the target includes a beacon transmitting section 321 that transmits a beacon signal, the HMD 100 receives, with the beacon receiving section 119, the beacon signal transmitted from the target. The control section 150 estimates a distance to the target on the basis of received signal strength indication of the received beacon signal. The control section 150 changes, according to the estimated distance to the target, the moving distance, the moving speed, and the acceleration of the pointer 301 moved by the first or second operation.

In this embodiment, as shown in FIG. 20, a moving distance of the pointer 301 in the case in which the distance between the HMD 100 and the target is a distance A is set smaller than a moving distance of the pointer 301 in the case in which the distance between the HMD 100 and the target is a distance B. It is assumed that the distance A is larger than a threshold and the distance B is smaller than the threshold.

For example, the control section 150 compares the distance estimated on the basis of the received signal strength indication of the beacon signal and a preset threshold and determines whether the distance between the HMD 100 and the target is larger than a distance set as the threshold.

When the distance between the HMD 100 and the target is larger than the threshold (the HMD 100 and the target is away from each other), the control section 150 detects the operation of the track pad 14, which is the first operation, and moves the position of the pointer 301 according to the detected first operation. When the distance between the HMD 100 and the target is larger than the threshold (the HMD 100 and the target are away from each other), the control section 150 sets the moving distance of the pointer 301 moved by the first operation to a first distance.

When the distance between the HMD 100 and the target is equal to or smaller than the threshold (the HMD 100 and the target are close to each other), the control section 150 detects a movement of the head, which is the second operation, and moves the position of the pointer 301 according to the detected movement. When the distance between the HMD 100 and the target is equal to or smaller than the threshold, the control section 150 sets the distance of the pointer 301 moved by the second operation to a second distance.

The second distance is set to a value larger than the first distance. That is, the moving distance of the pointer 301 is set to be larger as the distance between the HMD 100 and the target is smaller.

When the HMD 100 and the target are away from each other, a size of the target (the vending machine 305A or a commodity button) in the field of vision 300 of the user is small. When the moving distance of the pointer 301 by the first operation is set large, the pointer 301 sometimes greatly deviates from the target. For this reason, when the distance between the HMD 100 and the target is larger than the threshold, the moving distance of the pointer 301 is set small. When the HMD 100 and the target are close to each other, the size of the target in the field of vision 300 of the user is large. For this reason, even if the moving distance of the pointer 301 is set large, the pointer 301 is less likely to greatly deviate from the target. For this reason, when the distance between the HMD 100 and the target is smaller than the threshold, the moving distance of the pointer 301 is set large.

The moving distance of the pointer 301 may be continuously changed according to the distance between the HMD 100 and the target. The control section 150 estimates a distance to the target on the basis of the received signal strength indication of the beacon signal and changes, according to the estimated distance, the moving distance for moving the pointer 301 with the first or second operation. The control section 150 sets the distance for moving the pointer 301 according to the first or second operation to be larger as the distance between the HMD 100 and the target is smaller.

Contrary to the above explanation, the distance for moving the pointer 301 according to the first or second operation may be set to be smaller as the distance between the HMD 100 and the target is smaller.

In the above explanation, the first operation is selected when the distance between the HMD 100 and the target is larger than the threshold and the second operation is selected when the distance between the HMD 100 and the target is equal to or smaller than the threshold. Besides, the position of the pointer 301 may be moved by either one of the first operation and the second operation. That is, the pointer 301 may be operated by either one of the first operation and the second operation both when the distance between the HMD 100 and the target is larger than the threshold and when the distance between the HMD 100 and the target is equal to or smaller than the threshold.

In the explanation of FIG. 20, the distance between the HMD 100 and the target is estimated on the basis of the received signal strength indication of the beacon signal transmitted from the target. However, when the HMD 100 includes a stereo camera as the camera 61, the distance to the target may be calculated according to a picked-up image of the camera 61.

Figure 21:
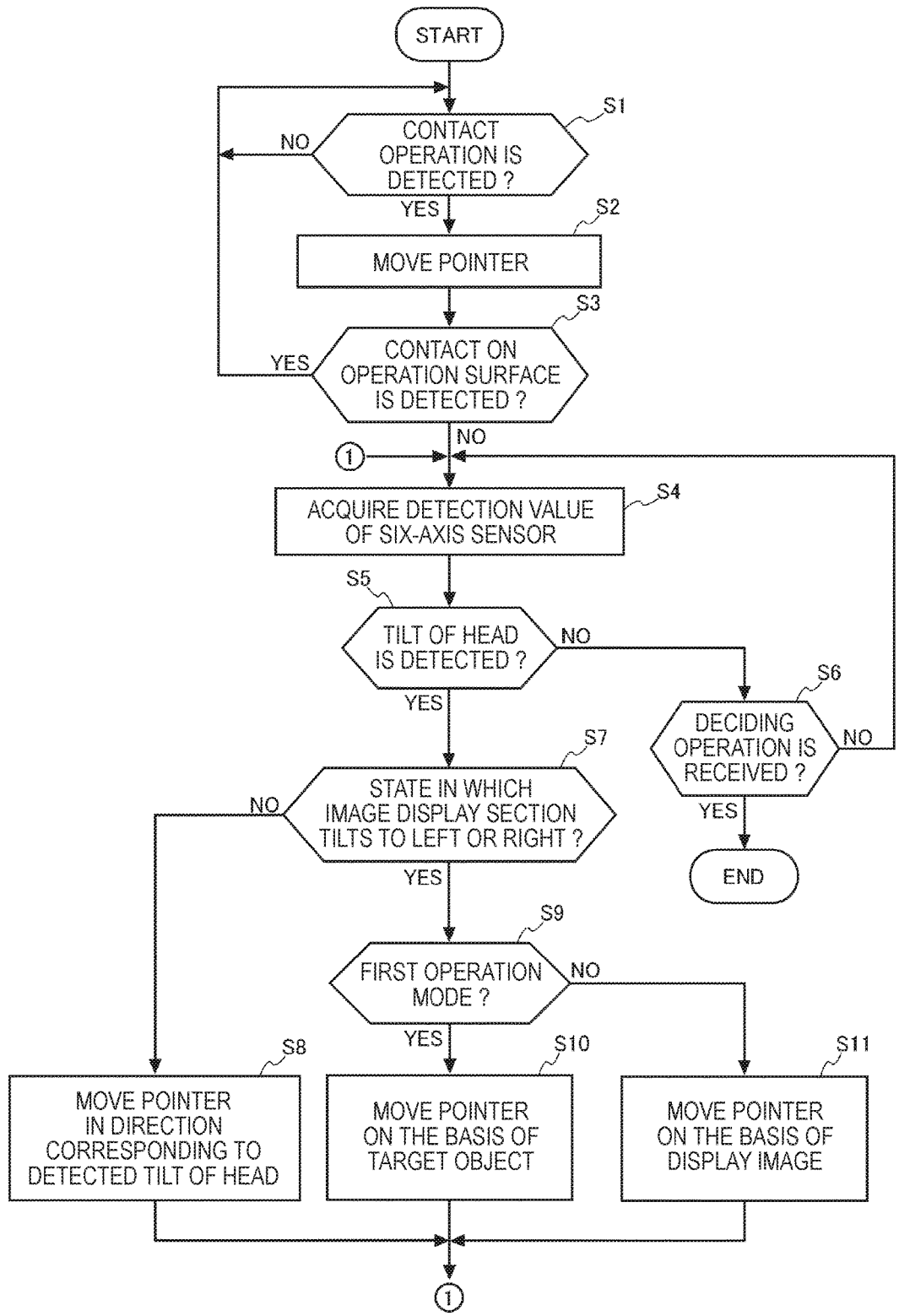
FIG. 21 is a flowchart for explaining the operation of the HMD.

FIG. 21 is a flowchart for explaining the operation of the HMD 100.

The control section 150 determines whether contact operation on the operation surface of the track pad 14 is detected (step S1). The control section 150 determines on the basis of an operation signal input from the track pad 14 whether the contact operation is detected (step S1). When the contact operation is not detected (NO in step S1), the control section 150 stays on standby until the contact operation is detected. If there is other executable processing, the control section 150 executes the processing. When the contact operation is detected (YES in step S1), the control section 150 moves the pointer 301 (step S2). A moving distance in which the control section 150 moves the pointer 301 is a distance corresponding to a moving distance of fingers of the user on the operation surface. A moving direction is a direction corresponding to a moving direction of the fingers of the user on the operation surface.

Subsequently, the control section 150 determines whether the fingers or the like of the user are in contact with the operation surface (step S3). In this embodiment, while the contact of the fingers or the like on the operation surface continues, the control section 150 moves the pointer 301 according to contact operation on the operation surface, which is the first operation. When the contact of the fingers or the like on the operation surface is not detected, the control section 150 switches the operation of the pointer 301 from the first operation to the second operation. In the second operation, the control section 150 detects a movement of the head of the user and moves the pointer 301 according to the detected movement of the head.

When the contact on the operation surface is detected (YES in step S3), the control section 150 returns to step S1 and determines whether the contact operation is detected (step S1). The control section 150 moves the pointer 301 according to the detected contact operation (step S2).

When the contact on the operation surface cannot be detected (NO in step S3), the control section 150 switches the operation of the pointer 301 to the second operation. First, the control section 150 acquires a detection value of the six-axis sensor 235 (step S4).

The control section 150 determines on the basis of the acquired detection value of the six-axis sensor 235 whether a movement of the head of the user is detected (step S5). When determining that there is no tilt in the head of the user (NO in step S5), the control section 150 determines whether end operation for ending the operation of the pointer 301 is received (step S6). When the end operation is not received (NO in step S6), the control section 150 returns to the determination in step S4 and continues to detect a movement of the head of the user on the basis of the detection value of the six-axis sensor 235 (step S5). When the end operation is received (YES in step S6), this control section 150 ends the processing flow.

When determining that there is a tilt in the head of the user (YES in step S5), the control section 150 determines whether the image display section 20 is in a state tilted to the left or the right (step S7). In this determination, the control section 150 determines whether the user performs a movement of tilting the head to the left or the right. When the head of the user tilts to the left or the right, the target object 305 in the outside scene visually recognized by the user via the image display section 20 is visually recognized in a tilted state to the left or the right. Therefore, when determining that the image display section 20 is in the tilted state to the left or the right, the control section 150 controls the movement of the pointer 301 to correspond to the tilt of the image display section 20.

When determining that the image display section 20 is not in the tilted state to the left or the right (NO in step S7), the control section 150 detects a movement of the head of the user on the basis of the detection value of the six-axis sensor 235 and moves the pointer 301 in a direction corresponding to the detected tilt (step S8).

For example, when a motion of turning the face of the user upward is detected, the control section 150 moves the pointer 301 in the upward direction, which is a positive direction of the z axis shown in FIG. 9. When a motion of turning the face of the user downward is detected, the control section 150 moves the pointer 301 in the downward direction, which is a negative direction of the z axis.

When a motion of turning the face of the user to the left, that is, left rotation around the Z axis is detected, the control section 150 moves the pointer 301 in the left direction, which is a positive direction of the x axis shown in FIG. 9. When a motion of turning the face of the user to the right, that is, right rotation around the Z axis is detected, the control section 150 moves the pointer 301 in the right direction, which is a negative direction of the x axis shown in FIG. 9.

When moving the pointer 301 on the basis of the target object 305, the control section 150 may move the pointer 301 horizontally on the basis of a detection value of the magnetic sensor 237.

When determining that the image display section 20 is in the tilted state to the left or the right (YES in step S7), the control section 150 determines whether the operation mode of the control section 150 is the first operation mode (step S9). In the first operation mode, when moving the pointer 301 in the horizontal direction, the control section 150 moves the pointer 301 to be horizontal to the outside scene. When the head of the user is in the tilted state to the left or the right, for the user, the target object 305 in the outside scene seen via the image display section 20 is also seen tilted. For this reason, when the operation mode is the first operation mode (YES in step S9), the control section 150 moves the pointer 301 on the basis of the target object 305 (step S10). That is, the control section 150 adjusts display such that the pointer 301 moves horizontally to the target object 305 in the outside scene (step S10). The control section 150 detects a rotation angle around the Y axis on the basis of a detection value of the six-axis sensor 235 and determines a tilt of the image display section 20. The control section 150 adjusts the display on the basis of the determined tilt of the image display section 20 such that the pointer 301 moves horizontally to the target object 305 (step S10).

When determining that the operation mode is not the first operation mode (NO in step S9) and is the second operation mode, the control section 150 moves the pointer 301 on the basis of a display image (step S11). That is, the control section 150 adjusts the display such that the pointer 301 is horizontal to the display image. When moving the pointer 301, the control section 150 returns to step S4, acquires a detection value of the six-axis sensor 235 anew, and detects a movement of the head (step S5).

When a movement of the head is not detected in the determination in step S5 (NO in step S5), the control section 150 determines whether the deciding operation is received (step S6). For example, when the operation for tapping the operation surface of the track pad 14 is received, the control section 150 determines that the deciding operation is received. When the deciding operation is received, the control section 150 determines that a target in a position overlapping the pointer 301 is selected and executes processing corresponding to the selected target. When the target is the target object 305, the control section 150 acquires parameters generated by calibration and converts a coordinate of the display region 310 where the pointer 301 is displayed into a coordinate on the picked-up image data on the basis of the acquired parameters. The control section 150 specifies the target object 305 reflected on the converted coordinate on the picked-up image data and executes processing corresponding to the specified target object 305. For example, when a commodity button of the vending machine 305A is selected as the target, the control section 150 performs wireless communication with the vending machine 305A and executes processing for purchasing a commodity of the selected commodity button. When a display image is selected as the target, the control section 150 executes processing associated with the display image. For example, when the display image is a menu screen and an item of a menu screen is selected by the pointer 301, the control section 150 executes processing corresponding to the selected item.

Figure 22:
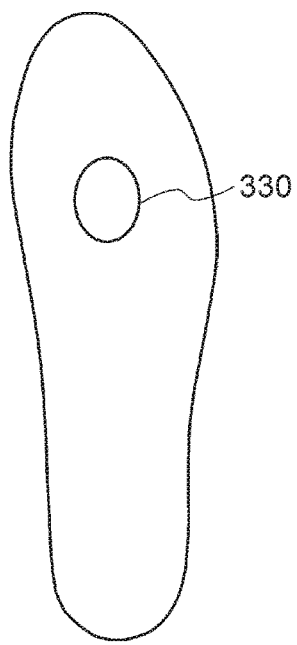
FIG. 22 is an explanatory diagram for explaining disposition of a detecting device attached to a shoe sole or the inside of a shoe of the user.

FIG. 22 is a disposition diagram showing disposition of a detecting device attached to a shoe sole or the inside of a shoe of the user.

In the embodiment explained above, the first operation and the second operation are detected by the HMD 100. However, the first operation and the second operation may be detected by an external device. In FIG. 22, a configuration is shown in which a detecting device 330 is disposed on a shoe sole or the inside of a shoe of the user and the first operation or the second operation is detected by the detecting device 330. The detecting device 330 includes, for example, a pressure sensor that detects pressure generated on a sole and a communication device that performs wireless communication with the HMD 100 through short-range wireless communication and transmits a detection value detected by the pressure sensor to the HMD 100 (both of the pressure sensor and the communication device are not shown in the figure).

In FIG. 22, an example is shown in which the detecting device 330 is disposed on a shoe sole or the inside of a shoe of the right foot and in the center of the shoe. The user applies weight in any one of directions of a toe side (the front side), a heel side (the rear side), the left side, or the right side according to a direction in which the pointer 301 is moved. The detecting device 330 detects a direction in which pressure is highest among the front, rear, left, and right directions and transmits a signal indicating the detected direction to the HMD 100. The HMD 100 determines on the basis of the signal transmitted from the detecting device 330 which direction among the front, rear, left, and right four directions is selected. The HMD 100 moves the pointer 301 in a direction corresponding to the determined direction.

For example, when the user applies weight to the toe side, the control section 150 moves the pointer 301 in the upward direction, which is the positive direction of the z axis shown in FIG. 9. When the user applies weight to the heel side, the control section 150 moves the pointer 301 in the downward direction, which is a negative direction of the z axis. When the user applies weight to the left side, the control section 150 moves the pointer 301 in the left direction, which is the positive direction of the x axis shown in FIG. 9. When the user applies weight to the right side, the control section 150 moves the pointer 301 to the right side, which is the negative direction of the x axis shown in FIG. 9. For example, when the user desires to move the pointer 301 in the depth direction (the Y-axis direction) of the display region of the pointer 301, the user performs a circular motion to apply weight to the front, rear, left, and right four directions in order. For example, when right rotations to the front, the right, the rear, and the left are detected, the control section 150 moves the pointer 301 to a near side, which is the positive direction of the y axis shown in FIG. 9. For example, when left rotations to the front, the left, the rear, and right are detected, the control section 150 moves the pointer 301 to the depth side, which is the negative direction of the y axis shown in FIG. 9.

Figure 23:
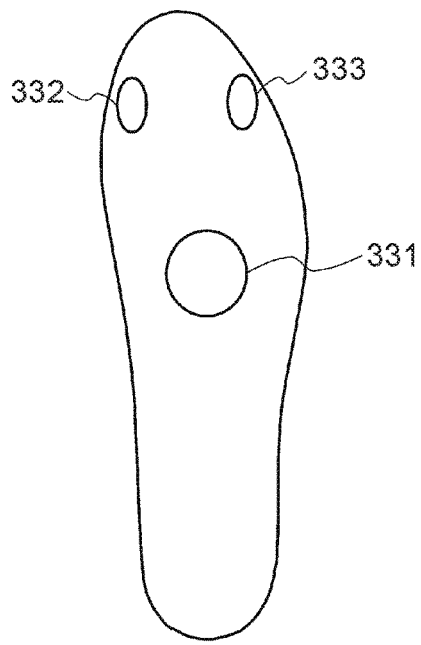
FIG. 23 is an explanatory diagram for explaining disposition of detecting devices attached to the shoe sole or the inside of the shoe of the user.

FIG. 23 is a diagram showing another disposition example of detecting devices.

In FIG. 22, the example is shown in which one detecting device 330 is provided on the shot sole or the inside of the shoe. However, as shown in FIG. 23, one detecting device 331 may be disposed in the center of the shoe sole or the inside of the shoe and two detecting devices 332 and 333 may be disposed on the toe side. The configuration of the detecting devices 331, 332, and 333 is the same as the configuration of the detecting device 330 shown in FIG. 22. However, the detecting devices 331, 332, and 333 transmit detection values of pressures detected by pressure sensors respectively included in the detecting devices 331, 332, and 333 to the HMD 100.

When the user applies weight forward (to the toe side), the detection values of the detecting devices 332 and 333 increase and the detection value of the detecting device 331 decreases. When the user applies weight backward (to the heel side), the detection value of the detecting device 331 increases and the detection values of the detecting devices 332 and 333 decrease.

When the user applies weight to the left side or the right side, the detection value of the detecting device 332 and the detection value of the detecting device 333 are values greatly different from each other. When the user applies weight to the left side, the detection value of the detecting device 332 increases and the detection value of the detecting device 333 decreases. When the user applies weight to the right side, the detection value of the detecting device 332 decreases and the detection value of the detecting device 333 increases.

Figure 24:
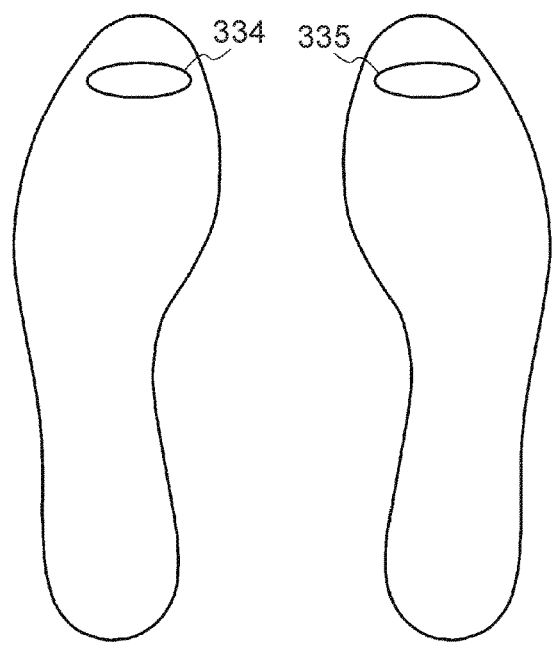
FIG. 24 is an explanatory diagram for explaining disposition of detecting devices attached to shoe soles or the insides of shoes of the user.

FIG. 24 is a diagram showing still another example of detecting devices.

A disposition example of the detecting devices shown in FIG. 24 is an example in which detecting devices 334 and 335 are respectively disposed on shoe soles or the insides of shoes of the left and right both feet. The configuration of the detecting devices 334 and 335 is the same as the configuration of the detecting device 330 shown in FIG. 22. The detecting devices 334 and 335 detect a direction in which pressure is highest among the front, rear, left, and right four directions and transmit signals indicating the detected direction to the HMD 100.

It is assumed that, for example, the user inputs operation for enlarging and displaying a display image displayed in the display position of the pointer 301. In this case, the user performs a motion of applying weight to the inner sides of the toes of both the feet and spreading the toes of both the feet, that is, operation for separating the toes of both the feet. In this case, the detecting device 334 of the left foot determines that the pressure on the inner side (the right side) of the left foot is high and transmits a signal indicating that the pressure on the right side is high to the HMD 100. The detecting device 335 of the right foot determines that the pressure on the inner side (the left side) of the right foot is high and transmits a signal indicating that the pressure on the left side is high to the HMD 100.

When determining according to the signal received from the detecting device 334 of the left foot that the pressure on the right side of the left foot is high and determining according to the signal received from the detecting device 335 of the right foot that the pressure on the left side of the right foot is high, the HMD 100 determines that operation of pinch-out is input. In this case, for example, the control section 150 of the HMD 100 causes the image display section 20 to enlarge and display a display image displayed in a position overlapping the pointer 301. In this embodiment, an example is explained in which the operation of the pinch-out is associated with the enlargement of the display image. However, the operation of the pinch-out may be associated with selecting operation for selecting the display image displayed in the position overlapping the pointer 301 and deciding operation for deciding the operation.

It is assumed that, for example, the user inputs operation for reducing and displaying a display image displayed in the display position of the pointer 301. In this case, the user performs a motion of applying weight to the inner sides of the toes of both the feet and closing the spread toes of both the feet. In this case, the detecting device 334 of the left foot determines that the pressure on the outer side (the left side) of the left foot is high and transmits a signal indicating that the pressure on the left side is high to the HMD 100. The detecting device 335 of the right foot determines that the pressure on the outer side (the right side) of the right foot is high and transmits a signal indicating that the pressure on the right side is high to the HMD 100.

When determining according to the signal received from the detecting device 334 of the left foot that the pressure on the left side of the left foot is high and determining according to the signal received from the detecting device 335 of the right foot that the pressure on the right side of the right foot is high, the HMD 100 determines that operation of pinch-in is input. In this case, for example, the control section 150 of the HMD 100 causes the image display section 20 to reduce and display a display image displayed in a position overlapping the pointer 301. In this embodiment, an example is explained in which the operation of the pinch-in is associated with the reduction of the display image. However, the operation of the pinch-in may be associated with selecting operation for selecting the display image displayed in the position overlapping the pointer 301 and deciding operation for deciding the operation.

As explained in detail above, the HMD 100 in the first embodiment includes the image display section 20, the display control section 153, and the detecting section.

The image display section 20 displays a display image in the display region 310 to be visually recognizable together with an outside scene. The display control section 153 causes the image display section 20 to display the pointer 301 indicating a pointed position in the display region 310. The detecting section includes the six-axis sensor 235 and the detection control section 151 and detects operation.

The display control section 153 switches the first operation mode for moving, according to operation detected by the detecting section, the position of the pointer 301 to correspond to the outside scene and the second operation mode for moving, according to the operation detected by the detecting section, the position of the pointer 301 in a form different from the movement corresponding to the outside scene.

Therefore, it is possible to switch the first operation mode for moving the position of the pointer 301 to correspond to the outside scene and the second operation mode for moving the position of the pointer 301 in the form different from the movement corresponding to the outside scene. For this reason, it is possible to move the pointer 301 in a plurality of modes. It is possible to improve operability of the pointer 301 and improve convenience of use of the HMD 100.

The six-axis sensor 235 and the detection control section 151 functioning as the detecting section detect the first operation and the second operation as the operation. The display control section 153 moves the position of the pointer 301 according to the first operation detected by the detecting section. After the movement of the pointer 301 corresponding to the first operation, the display control section 153 moves, according to the second operation detected by the detecting section, the position of the pointer 301 in a form different from the movement of the pointer 301 corresponding to the first operation.

Therefore, it is possible to move the position of the pointer 301 according to a plurality of kinds of operation of the first operation and the second operation. It is possible to move the pointer 301 in different forms in the first operation and the second operation. For this reason, it is possible to improve the operability of the pointer 301 and improve the convenience of use of the head-mounted display device.

The display control section 153 moves, starting from the position of the pointer 301 moved by the first operation, according to the second operation, the position of the pointer 301 in a form different from the first operation.

Therefore, it is possible to move the position of the pointer 301 according to the second operation starting from the position of the pointer 301 moved by the first operation.

The six-axis sensor 235 and the detection control section 151 functioning as the detecting section detect a motion of the user as at least either one of the first operation and the second operation.

Therefore, since the motion of the user is detected as at least either one of the first operation and the second operation, it is possible to move the position of the pointer 301 according to the motion.

The six-axis sensor 235 and the detection control section 151 functioning as the detecting section detect at least one of a tilt of the head with respect to the body axis of the user and rotation of the head around the body axis as a motion of the user.

The display control section 153 determines a movement amount of the pointer 301 in either one of the vertical direction and the horizontal direction of the display region 310 on the basis of at least one of the tilt of the head and the rotation around the body axis detected by the detecting section. The display control section 153 moves the position of the pointer 301 on the basis of the determined movement amount.

Therefore, it is possible to move the pointer 301 according to the tilt of the head or the rotation of the head around the body axis of the user.

The HMD 100 includes, as the detecting section, the operation section 110 and the operation control section 149 and the six-axis sensor 235 and the detection control section 151.

The HMD 100 detects, as the first operation, operation received by the operation section 110 and the operation control section 149 and detects, as the second operation, a movement of the head detected by the six-axis sensor 235 and the detection control section 151.

Therefore, it is possible to move the position of the pointer 301 according to the operation of the operation section and the movement of the head.

The HMD 100 includes the camera 61 functioning as the imaging section that images an outside scene.

During execution of the first operation mode, the display control section 153 specifies, on the basis of a picked-up image of the camera 61, a target object visually recognized over the pointer 301. During execution of the second operation mode, the display control section 153 specifies a display image corresponding to the position of the pointer 301 from a plurality of display images displayed in the display region 310.

Therefore, by changing the operation mode to the first operation mode and the second operation mode, it is possible to switch a target to be specified.

During the execution of the first operation mode, when the first operation or the second operation is detected by the detecting section, the display control section 153 moves, according to the first operation or the second operation, the pointer 301 on the basis of an outside scene visually recognized by the user. During the execution of the second operation mode, when the first operation or the second operation is detected by the detecting section, the display control section 153 moves, according to the first operation or the second operation, the pointer 301 on the basis of a display image visually recognized by the user.

Therefore, it is easy to align the pointer 301 with the position of the target object or the display image by switching the operation mode.

When moving the pointer 301 according to the second operation, the display control section 153 sets a movement amount for moving the pointer 301 according to the second operation smaller than a movement amount for moving the pointer 301 according to the first operation. Consequently, the movement of the pointer 301 corresponding to the first operation and the movement of the pointer 301 corresponding to the second operation are moved in different forms.

Therefore, it is possible to make it easy to align the pointer 301 with the target object 305 or the display image. It is possible to reduce the number of times of operation for moving the pointer 301 to the position of the target object or the display image.

The HMD 100 includes the beacon receiving section 119 functioning as the distance detecting section that detects a distance to a target object visually recognized by the user through the image display section 20. The display control section 153 moves the pointer 301 in a different form according to the distance to the target object detected by the beacon receiving section 119.

Therefore, it is possible to move the pointer 301 in a different form according to the distance to the target object. Therefore, it is possible to improve the operability of the operation of the pointer 301 and improve the convenience of use of the head-mounted display device.

When the distance to the target object 305 detected by the beacon receiving section 119 is larger than the threshold, the display control section 153 sets, as the first operation, operation detected by the detecting section. When the distance to the target object 305 detected by the beacon receiving section 119 is equal to or smaller than the threshold, the display control section 153 sets, as the second operation, the operation detected by the detecting section. The display control section 153 sets a movement amount for moving the pointer 301 according to the first operation smaller than a movement amount for moving the pointer 301 according to the second operation.

Therefore, according to the distance to the target object 305, it is possible to change the operation used for the movement of the pointer 301 and change the movement amount of the pointer 301. For this reason, it is possible to improve the operability of the operation of the pointer 301 and improve the convenience of use of the HMD 100.

The HMD 100 includes the operation section 110 that receives operation.

The display control section 153 detects a moving object on the basis of a picked-up image of the camera 61 and causes the image display section 20 to display the pointer 301 in a position of the display region 310 corresponding to the detected moving object.

Therefore, it is possible to display the pointer 301 in the position of the display region 310 corresponding to the moving object.

The HMD 100 includes the camera 61 and the imaging control section 147 that image the QR code 340 disposed on the target object 305 and detect the QR code 340.

The display control section 153 causes the image display section 20 to display the pointer 301 in a position on the target object 305 where the QR code 340 detected by the camera 61 and the imaging control section 147 is disposed. The display control section 153 moves the position of the pointer 301 according to operation detected by the operation section 110, the six-axis sensor 235, and the detection control section 151.

Therefore, it is possible to easily perform alignment of the pointer 301.

The beacon receiving section 119 receives a beacon signal transmitted from the beacon transmitter 345 disposed on the target object 305. The display control section 153 is connected to the beacon transmitter 345 on the basis of the beacon signal received by the beacon receiving section 119, receives additional information transmitted from the beacon transmitter 345, and causes the image display section 20 to display the additional information in the display region 310.

Therefore, it is possible to acquire and display the additional information from the beacon transmitter 345.

Second Embodiment

A second embodiment of the invention is explained.

A configuration in this embodiment is the same as the configuration in the first embodiment. Therefore, explanation concerning the configuration of the HMD 100 in the second embodiment is omitted.

For example, when operation for disabling operation of the pointer 301 is received by the operation section 110, the control section 150 in this embodiment causes the storing section 125 to store display position information indicating a display position of the pointer 301. At this point, it is assumed that a coordinate of the display region 310 serving as the display position information is stored in the storing section 125. In this case, for example, when the pointer 301 is displayed in the position or the vicinity of the target object 305 present in an outside scene, if the user moves the head, the position of the pointer 301 also moves. For this reason, when it is attempted to enable the disabled operation of the pointer 301 and operate the pointer 301, the pointer 301 sometimes moves from a display position before the disabling of the operation of the pointer 301.

For this reason, in this embodiment, when receiving the operation for disabling the operation of the pointer 301, the control section 150 associates the display position of the pointer 301 with a coordinate of a three-dimensional space and causes the storing section 125 to store the coordinate of the three-dimensional space.

When receiving the operation for disabling the operation of the pointer 301, the control section 150 detects an azimuth angle of the HMD 100 (the head of the user) on the basis of a detection value of the magnetic sensor 237 (or 113). The control section 150 detects an angle of elevation of the HMD 100 (the head of the user) on the basis of a detection value of the six-axis sensor 235. The control section 150 calculates, on the basis of the detected azimuth angle and the detected angle of elevation, a coordinate (an azimuth angle and an angle of elevation) in the three-dimensional space with which the display position of the pointer 301 is associated. The control section 150 causes the storing section 125 to store the calculated azimuth angle and the calculated angle of elevation as display position information.

The control section 150 may erase the display of the pointer 301 from the display region 310 at a point in time when the operation of the pointer 301 is disabled. The control section 150 may continue to display, without erasing the display of the pointer 301, the pointer 301 in a position where the pointer 301 is displayed at the point in time when the operation is disabled. In this case, if the user moves the head and the body and the display position of the pointer 301 deviates from the display region 310, the pointer 301 is not displayed in the display region 310. However, when the user moves the head and the body to locate, in the display region 310, the coordinate of the pointer 301 indicated by the display position information, the pointer 301 is displayed in the display region 310 again.

When the user operates the pointer 301 again, for example, the user operates the operation section 110 and enables the operation of the pointer 301. The user moves the head and the body to locate, in the display region 310, the coordinate of the three-dimensional space stored in the storing section 125 as the display position information. The control section 150 calculates an azimuth angle and an angle of elevation on the basis of detection values of the magnetic sensor 237 (or 113) and the six-axis sensor 235 and determines whether the coordinate of the pointer 301 indicated by the display position information is located in the display region 310. When determining that the coordinate of the pointer 301 indicated by the display position information is located in the display region 310, the control section 150 causes the image display section 20 to display the pointer 301 in the display region 310. The control section 150 receives the first operation or the second operation and moves the display position of the pointer 301 according to the received operation.

As explained above, in this embodiment, when the operation of the pointer 301 is disabled, the control section 150 causes the storing section 125 to store the display position of the pointer 301 in association with the coordinate of the three-dimensional space. For this reason, even if the user moves the head and the body while the operation is disabled, the display position of the pointer 301 does not move. When the operation of the pointer 301 is enabled, it is possible to display the pointer 301 in the display position at the time when the operation is disabled.

Note that the invention is not limited to the configurations in the embodiments and can be carried out in various modes in a range not departing from the spirit of the invention.

For example, in the embodiments, the operation for operating the track pad 14 to move the display position of the pointer 301 is explained as the first operation and the operation for moving the head of the user to move the display position of the pointer 301 is explained as the second operation. Contrary to this explanation, the operation for moving the head of the user to move the display position of the pointer 301 may be set as the first operation and the operation for operating the track pad 14 to move the display position of the pointer 301 may be set as the second operation.

In the embodiments explained above, the configuration is illustrated in which the control device 10 is connected to the image display section 20 by wire. However, the invention is not limited to this. The image display section 20 may be wirelessly connected to the control device 10. As a wireless communication system in this case, the system illustrated as the communication system to which the communication section 117 is adopted may be adopted or other communication systems may be adopted.

When the HMD 100 is in a state for detecting the first operation, the control section 150 generates an image or a message indicating that the HMD 100 is in the state for detecting the first operation and causes the image display section 20 to display the generated image or message. When the HMD 100 is in a state for detecting the second operation, the control section 150 generates an image or a message indicating that the HMD 100 is in the state for displaying the second operation and causes the image display section 20 to display the generated image or message.

When the operation mode of the HMD 100 is the first operation mode, the control section 150 generates an image or a message indicating that the operation mode is the first operation mode and causes the image display section 20 to display the generated image or message. When the operation mode of the HMD 100 is the second operation mode, the control section 150 generates an image or a message indicating that the operation mode is the second operation mode and causes the image display section 20 to display the generated image or message.

A part of the functions included in the control device 10 may be provided in the image display section 20. The control device 10 may be realized by a plurality of devices. That is, the control device 10 is not limited to the configuration including the box-shaped case 10A. For example, a wearable device attachable to the body of the user, clothes, or an ornament worn by the user may be used instead of the control device 10. The wearable device in this case may be, for example, a watch-type device, a finger ring-type device, a laser pointer, a mouse, an air mouse, a game controller, or a pen-type device.

Further, in the embodiments explained above, the configuration in which the image display section 20 and the control device 10 are separated and connected via the connection cable 40 is explained as the example. The invention is not limited to this. A configuration is also possible in which the control device 10 and the image display section 20 are integrally configured and worn on the head of the user.

As the control device 10, a notebook computer, a tablet computer, or a desktop computer may be used. As the control device 10, portable electronic devices including a game machine, a cellular phone, a smart phone, and a portable media player, other dedicated devices, and the like may be used.

In the embodiments, the configuration in which the user visually recognizes the outside scene through the display section is not limited to the configuration in which the right light guide plate 26 and the left light guide plate 28 transmit external light. For example, the invention is also applicable to a display device that displays an image in a state in which the outside scene cannot be visually recognized. The invention can be applied to a display device that displays a picked-up image of the camera 61, an image and a CG generated on the basis of the picked-up image, a video based on video data stored in advance and video data input from the outside, and the like. The display device of this type can include a display device of a so-called closed type with which the outside scene cannot be visually recognized. The invention can also be applied to a display device that does not perform processing such as AR display for displaying an image to be superimposed on a real space as explained in the embodiment and MR (Mixed Reality) display for combining a picked-up image of a real space and a virtual image. The invention can also be applied to a display device that does not perform processing such as VR (Virtual Reality) display for displaying a virtual image. For example, a display device that displays video data or an analog video signal input from the outside is also naturally included in application targets of the invention.

For example, display sections of other types such as an image display section worn like a cap may be adopted instead of the image display section 20. The HMD 100 only has to include a display section that displays an image corresponding to the left eye LE of the user and a display section that displays an image corresponding to the right eye RE of the user. The display device of the invention may be configured as a head mounted display mounted on vehicles such as an automobile and an airplane. The display device may be configured as a head mounted display incorporated in a body protector such as a helmet. In this case, a portion for positioning a position with respect to the body of the user and a portion positioned with respect to the portion can be set as mounting sections.

As the optical system that guides image light to the eyes of the user, the configuration is illustrated in which virtual images are formed in a part of the right light guide plate 26 and the left light guide plate 28 by the half mirrors 261 and 281. The invention is not limited to this. An image may be displayed in a display region having an area occupying the entire or most of the surfaces of the right light guide plate 26 and the left light guide plate 28. In this case, processing for reducing an image may be included in an operation for changing a display position of the image.

Further, the optical elements of the invention are not limited to the right light guide plate 26 and the left light guide plate 28 including the half mirrors 261 and 281 and only have to be optical components that make image light incident on the eyes of the user. Specifically, a diffraction grating, a prism, and a holography display section may be used.

At least a part of the functional blocks shown in FIGS. 4 and 5 and the like may be realized by hardware or may be realized by cooperation of hardware and software and are not limited to the configuration in which the independent hardware resources are disposed as shown in the figures. The computer programs to be executed by the control section 150 may be stored in the nonvolatile storing section 121 or other storage devices (not shown in the figure) in the control device 10. The control section 150 may acquire computer programs stored in an external device via the communication section 117 and the external connector 184 and execute the computer programs. Among the components formed in the control device 10, the operation section 110 may be formed as a user interface (UI).

The processing units of the flowchart of FIG. 21 are divided according to the main processing contents in order to facilitate understanding of the processing of the control section 150 of the HMD 100. The invention is not limited by a method of division and names of the processing units. The processing of the control section 150 can be divided into a larger number of processing units according to processing contents or can be divided such that one processing unit includes a larger number of kinds of processing. The processing order of the flowchart is not limited to the illustrated example.

The entire disclosure of Japanese Patent Application Nos. 2016-232373, filed Nov. 30, 2016 and 2017-105477, filed May 29, 2017 are expressly incorporated by reference herein.

What is claimed is:
1. A head-mounted display device mounted on a head of a user, the head-mounted display device comprising:
   a display section configured to display a display image in a display region to be recognizable together with an outside scene;

a display control section configured to cause the display section to display, in the display region, a marker indicating a pointed position; and a detecting section configured to detect operation, wherein the display control section switches a first operation mode for moving, according to the operation detected by the detecting section, a position of the marker to correspond to the outside scene and a second operation mode for moving, according to the operation detected by the detecting section, the position of the marker in a form different from the movement corresponding to the outside scene, the display control section changing a movement amount of the marker depending on whether the marker is moved according to a first operation or according to a second operation different from the first operation, the movement amount being a moving distance, moving speed or acceleration of the marker.

2. The head-mounted display device according to claim 1, wherein the detecting section detects the first operation and the second operation as the operation, and the display control section moves the position of the marker according to the first operation detected by the detecting section and, after the movement of the marker corresponding to the first operation, moves, according to the second operation detected by the detecting section, the position of the marker in a form different from the movement of the marker corresponding to the first operation.

3. The head-mounted display device according to claim 2, wherein the display control section moves, starting from the position of the marker moved by the first operation, according to the second operation, the position of the marker in a form different from the first operation.

4. The head-mounted display device according to claim 2, wherein the detecting section detects a motion of the user as at least either one of the first operation and the second operation.

5. The head-mounted display device according to claim 4, wherein the detecting section detects, as the motion of the user, at least one of a tilt of the head with respect to a body axis of the user and rotation of the head around the body axis, and the display control section determines a movement amount of the marker in at least either one direction of a vertical direction and a horizontal direction of the display region on the basis of at least one of the tilt and the rotation around the body axis of the head detected by the detecting section and moves the position of the marker on the basis of the determined movement amount.

6. The head-mounted display device according to claim 2, wherein the detecting section detects, as the first operation, operation received by an operation section included in the head-mounted display device and detects a movement of the head as the second operation.

7. The head-mounted display device according to claim 1, further comprising an imaging section configured to image the outside scene, wherein the display control section specifies, during execution of the first operation mode, on the basis of a picked-up image of the imaging section, a target object visually recognized over the marker and specifies, during execution of the second operation mode, the display image corresponding to the position of the marker from a plurality of the display images displayed in the display region.

8. The head-mounted display device according to claim 2, wherein during execution of the first operation mode, when the first operation or the second operation is detected by the detecting section, the display control section moves, according to the first operation or the second operation, the marker on the basis of the outside scene visually recognized by the user, and during execution of the second operation mode, when the first operation or the second operation is detected by the detecting section, the display control section moves, according to the first operation or the second operation, the marker on the basis of the display image visually recognized by the user.

9. The head-mounted display device according to claim 2, wherein, when moving the marker according to the second operation, the display control section sets a movement amount for moving the marker according to the second operation smaller than a movement amount for moving the marker according to the first operation to perform the movement of the marker corresponding to the first operation and the movement of the marker corresponding to the second operation in different forms.

10. The head-mounted display device according to claim 2, further comprising a distance detecting section configured to detect a distance to a target object visually recognized by the user through the display section, wherein the display control section moves the marker in a different form according to the distance to the target object detected by the distance detecting section.

11. The head-mounted display device according to claim 10, wherein the display control section sets the operation detected by the detecting section as the first operation when the distance to the target object detected by the distance detecting section is larger than a threshold, sets the operation detected by the detecting section as the second operation when the distance to the target object detected by the distance detecting section is equal to or smaller than the threshold, and sets a movement amount for moving the marker according to the first operation smaller than a movement amount for moving the marker according to the second operation.

12. A head-mounted display device mounted on a head of a user, the head-mounted display device comprising:

a display section configured to display a display image in a display region to be transmitted through an outside scene and recognizable together with the outside scene;

an imaging section configured to image the outside scene; and a display control section configured to cause the display section to display, in the display region, a marker indicating a pointed position, wherein the display control section switches and executes, on the basis of a picked-up image of the imaging section, a first operation mode for specifying a target object visually recognized over the marker and a second operation mode for specifying the display image corresponding to a position of the marker from a plurality of the display images displayed in the display region, the display control section changing a movement amount of the marker depending on whether the marker is moved according to a first operation or according to a second operation different from the first operation, the movement amount being a moving distance, moving speed or acceleration of the marker.

13. The head-mounted display device according to claim 12, further comprising a detecting section configured to detect operation, wherein
during execution of the first operation mode, when the operation is detected by the detecting section, the display control section moves, according to the detected operation, the marker on the basis of the outside scene visually recognized by the user, and
during execution of the second operation mode, when the operation is detected by the detecting section, the display control section moves, according to the detected operation, the marker on the basis of the display image visually recognized by the user.

14. The head-mounted display device according to claim 12, wherein
the detecting section detects, as the first operation, operation received by the operation section included in the head-mounted display device and detects a movement of a head of the user as the second operation, and
the display control section moves a position of the marker according to the first operation detected by the detecting section and, after the movement of the marker corresponding to the first operation, moves the position of the marker according to the second operation detected by the detecting section, and sets a movement amount in moving the marker according to the second operation smaller than a movement amount in moving the marker according to the first operation.

15. The head-mounted display device according to claim 13, wherein the display control section causes, during execution of the first operation mode, the display section to display indication indicating a moving direction of the marker based on the outside scene and causes, during execution of the second operation mode, the display section to display indication indicating a moving direction of the marker based on the display image.

16. The head-mounted display device according to claim 12, wherein the display control section manages a display position of the marker according to a coordinate in the display region and, when the operation detected by the detecting section is disabled, manages the display position of the marker in association with a coordinate of a three-dimensional space corresponding to a real space.

17. The head-mounted display device according to claim 12, further comprising an operation section configured to receive operation, wherein
the display control section detects a moving object on the basis of the picked-up image of the imaging section and causes the display section to display the marker in a position of the display region corresponding to the detected moving object.

18. The head-mounted display device according to claim 12, further comprising a mark detecting section configured to detect an identification mark disposed in the target object, wherein
the display control section causes the display section to display the marker in a position of the target object where the identification mark detected by the mark detecting section is disposed and moves the position of the marker according to the operation detected by the detecting section.

19. The head-mounted display device according to claim 12, further comprising a receiving section configured to receive a beacon signal transmitted from a beacon transmitter disposed in the target object, wherein the display control section is connected to the beacon transmitter on the basis of the beacon signal received by the receiving section, receives additional information transmitted from the transmitter, and causes the display section to display the additional information in the display region.

20. A non-transitory, computer readable medium having a computer program stored thereon, the program being executed by a computer mounted on a head-mounted display device including: a display section configured to display a display image in a display region to be transmitted through an outside scene and recognizable together with the outside scene; a display control section configured to cause the display section to display, in the display region, a marker indicating a pointed position; and a detecting section configured to detect operation, the head-mounted display device being mounted on a head of a user,
the computer program causing the computer to execute:
a first procedure for moving, according to the operation detected by the detecting section, a position of the marker to correspond to the outside scene; and
a second procedure for moving, according to the operation detected by the detecting section, the position of the marker in a form different from the movement corresponding to the outside scene,
wherein a movement amount of the marker is changed depending on whether the position of the marker is moved according to a first operation or according to a second operation different from the first operation, the movement amount being a moving distance, moving speed or acceleration of the marker.

21. A control method for a head-mounted display device including: a display section configured to display a display image in a display region to be transmitted through an outside scene and recognizable together with the outside scene; a display control section configured to cause the display section to display, in the display region, a marker indicating a pointed position; and a detecting section configured to detect operation, the head-mounted display device being mounted on a head of a user,
the control method comprising:
a first step of moving, according to the operation detected by the detecting section, a position of the marker to correspond to the outside scene; and
a second step of moving, according to the operation detected by the detecting section, the position of the marker in a form different from the movement corresponding to the outside scene,
wherein a movement amount of the marker is changed depending on whether the position of the marker is moved according to a first operation or according to a second operation different from the first operation, the movement amount being a moving distance, moving speed or acceleration of the marker.

22. The head-mounted display device according to claim 1, wherein when the user tilts the head, the display region tilts according to the tilt of the head, but a target object seen via the display section does not tilt and the marker is moved in a lateral direction of the display region.

23. The head-mounted display device according to claim 1, wherein when the user tilts the head, the display region tilts according to the tilt of the head, but a target object seen via the display section does not tilt and the marker is moved in a horizontal direction horizontal to the ground of the display region.

* * * * *